(12) United States Patent
Dunlap et al.

(10) Patent No.: US 11,858,691 B2
(45) Date of Patent: *Jan. 2, 2024

(54) METHOD OF PRODUCTION OF FABRIC BAGS OR CONTAINERS USING HEAT FUSED SEAMS

(71) Applicant: AMERIGLOBE, LLC, Lafayette, LA (US)

(72) Inventors: Clifford Dunlap, Baton Rouge, LA (US); Daniel R. Schnaars, Sr., Lafayette, LA (US)

(73) Assignee: AMERIGLOBE, LLC, Lafayette, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,572

(22) Filed: Mar. 17, 2022

(65) Prior Publication Data

US 2022/0274740 A1 Sep. 1, 2022

Related U.S. Application Data

(60) Continuation of application No. 17/219,398, filed on Mar. 31, 2021, now Pat. No. 11,279,523, which is a
(Continued)

(51) Int. Cl.
*B65D 33/00* (2006.01)
*A41H 43/04* (2006.01)
(Continued)

(52) U.S. Cl.
CPC .............. *B65D 33/00* (2013.01); *A41H 43/04* (2013.01); *B29C 65/02* (2013.01); *B29C 65/38* (2013.01);
(Continued)

(58) Field of Classification Search
CPC .............. B65D 29/02; B29L 2031/7128; B29L 2031/7129
See application file for complete search history.

(56) References Cited

U.S. PATENT DOCUMENTS 3,772,116 A 11/1973 Schaffron
3,788,199 A 1/1974 Sato et al.
(Continued)

FOREIGN PATENT DOCUMENTS

CN 101802294 8/2010
CN 102883970 1/2013
(Continued)

OTHER PUBLICATIONS

Encyclopedia of Polymer Science, vol. 11, Propylene Polymers.
(Continued)

*Primary Examiner* — Scott W Dodds
(74) *Attorney, Agent, or Firm* — Garvey, Smith & Nehrbass, Patent Attorneys, L.L.C.; Julia M. FitzPatrick; Gregory C. Smith

(57) ABSTRACT

A method of producing flexible polypropylene fabric bags with heat fused seams comprising providing fabric pieces, wherein each fabric piece has a coated side and an uncoated side; positioning fabric pieces so that a coated side of one fabric piece faces a coated side of another fabric piece; selecting an area of fabric to be joined for forming a seam or joint; applying heat to the area to be joined that is less than the melting point of the fabrics, for forming one or more seams or joints and wherein the heat fused seams or joints of a resulting polypropylene bag retains at least 85% of the fabric strength without using sewing machines.

20 Claims, 11 Drawing Sheets

Related U.S. Application Data division of application No. 16/126,635, filed on Sep. 10, 2018, now Pat. No. 10,974,869, which is a continuation of application No. 14/297,441, filed on Jun. 5, 2014, now Pat. No. 10,112,739.

(60) Provisional application No. 61/994,642, filed on May 16, 2014, provisional application No. 61/909,737, filed on Nov. 27, 2013, provisional application No. 61/890,664, filed on Oct. 14, 2013, provisional application No. 61/831,476, filed on Jun. 5, 2013.

(51) Int. Cl.
| | |
|---|---|
| B29C 65/00 | (2006.01) |
| B32B 5/02 | (2006.01) |
| B32B 5/26 | (2006.01) |
| D06H 5/00 | (2006.01) |
| B29C 65/38 | (2006.01) |
| B29C 65/62 | (2006.01) |
| B29C 65/82 | (2006.01) |
| B29C 65/02 | (2006.01) |
| D03D 1/02 | (2006.01) |
| B29L 31/00 | (2006.01) |
| B31B 50/00 | (2017.01) |
| B31B 70/62 | (2017.01) |
| B31B 70/68 | (2017.01) |
| B31B 150/00 | (2017.01) |
| B31B 160/30 | (2017.01) |
| B31B 160/20 | (2017.01) |
| B31B 70/64 | (2017.01) |
| B31B 70/74 | (2017.01) |
| B29C 65/16 | (2006.01) |
| B65D 30/08 | (2006.01) |

(52) U.S. Cl.
CPC .......... *B29C 65/62* (2013.01); *B29C 65/8215* (2013.01); *B29C 66/1122* (2013.01); *B29C 66/43* (2013.01); *B29C 66/71* (2013.01); *B29C 66/723* (2013.01); *B29C 66/7292* (2013.01); *B29C 66/73115* (2013.01); *B29C 66/8322* (2013.01); *B29C 66/91411* (2013.01); *B29C 66/91935* (2013.01); *B32B 5/024* (2013.01); *B32B 5/26* (2013.01); *D03D 1/02* (2013.01); *D06H 5/00* (2013.01); *B29C 65/16* (2013.01); *B29C 65/8223* (2013.01); *B29C 66/73711* (2013.01); *B29C 66/73921* (2013.01); *B29L 2031/712* (2013.01); *B29L 2031/7128* (2013.01); *B31B 50/00* (2017.08); *B31B 70/62* (2017.08); *B31B 70/642* (2017.08); *B31B 70/68* (2017.08); *B31B 70/79* (2017.08); *B31B 2150/00* (2017.08); *B31B 2150/003* (2017.08); *B31B 2160/20* (2017.08); *B31B 2160/30* (2017.08); *B32B 2250/20* (2013.01); *B32B 2255/02* (2013.01); *B32B 2255/26* (2013.01); *B32B 2262/0253* (2013.01); *B32B 2307/21* (2013.01); *B32B 2307/31* (2013.01); *B32B 2307/714* (2013.01); *B32B 2309/02* (2013.01); *B32B 2309/12* (2013.01); *B32B 2323/10* (2013.01); *B65D 29/02* (2013.01); *Y10T 156/10* (2015.01)

(56) References Cited

U.S. PATENT DOCUMENTS

| | | |
|---|---|---|
| 3,924,383 A | 12/1975 | Heger |
| 4,114,669 A | 9/1978 | Bishop |
| 4,479,243 A | 10/1984 | Derby et al. |
| 4,480,766 A | 11/1984 | Platt |
| 4,596,040 A | 6/1986 | Lafleur et al. |
| 4,781,475 A | 11/1988 | Lafleur |
| 4,906,320 A | 3/1990 | Powers |
| 5,009,632 A | 4/1991 | Kruessel |
| 5,104,236 A | 4/1992 | LaFleur |
| 5,358,335 A | 10/1994 | LaFleur |
| 5,417,035 A | 5/1995 | English |
| 5,695,598 A | 12/1997 | Groshens et al. |
| 5,823,683 A | 10/1998 | Antonacci et al. |
| 5,918,984 A | 7/1999 | LaFleur et al. |
| 6,063,418 A | 5/2000 | Sugimoto et al. |
| 6,179,467 B1 | 1/2001 | Derby et al. |
| 6,374,579 B1 | 4/2002 | Muller |
| 6,935,782 B2 | 8/2005 | Cholsaipant |
| 7,081,078 B2 | 7/2006 | Bailey et al. |
| 7,091,078 B2 | 8/2006 | Laux |
| 7,276,269 B2 | 10/2007 | Kraimer et al. |
| 8,236,711 B1 | 8/2012 | Wang |
| 8,297,840 B2 | 10/2012 | Jansen |
| 8,562,214 B2 | 10/2013 | Dozier et al. |
| 9,067,364 B2 | 6/2015 | Fuerst et al. |
| 10,112,739 B2 | 10/2018 | Dunlap et al. |
| 10,974,869 B2 | 4/2021 | Dunlap et al. |
| 11,279,523 B2 | 3/2022 | Dunlap et al. |
| 2003/0089760 A1 | 5/2003 | Nobbe |
| 2003/0123757 A1 | 7/2003 | Cholsaipant |
| 2008/0115458 A1 | 5/2008 | Funaki et al. |
| 2008/0176009 A1 | 7/2008 | Chereau et al. |
| 2009/0260324 A1 | 10/2009 | Funaki et al. |
| 2010/0158418 A1 | 6/2010 | Jansen |
| 2010/0209024 A1 | 8/2010 | Fuerst et al. |
| 2010/0209025 A1 | 8/2010 | Futase |
| 2011/0019942 A1 | 1/2011 | Piraneo |
| 2011/0033135 A1 | 2/2011 | Breck et al. |
| 2011/0085749 A1 | 4/2011 | Frei et al. |
| 2011/0142378 A1 | 6/2011 | Samadijavan et al. |
| 2011/0206300 A1 | 8/2011 | Koesters et al. |
| 2012/0094563 A1 | 4/2012 | Arroyo Villan et al. |
| 2012/0227363 A1 | 9/2012 | Nussbaum |
| 2012/0314979 A1 | 12/2012 | Heininga |
| 2012/0329353 A1 | 12/2012 | Davis et al. |
| 2013/0064481 A1 | 3/2013 | Yamamoto et al. |
| 2013/0202231 A1 | 8/2013 | Nowak et al. |
| 2013/0209002 A1 | 8/2013 | Bazbaz |
| 2013/0279833 A1 | 10/2013 | Wallander |
| 2013/0305664 A1 | 11/2013 | Arroyo Yillan et al. |
| 2015/0314919 A1 | 11/2015 | Wilkes et al. |

FOREIGN PATENT DOCUMENTS

| | | |
|---|---|---|
| DE | 10234510 | 2/2004 |
| EP | 1298075 | 4/2003 |
| EP | 2570365 | 3/2013 |
| GB | 1604213 | 12/1981 |
| JP | 56SHO56-081888 U1 | 11/1979 |
| JP | H061389 | 1/1994 |
| SU | 1533636 | 1/1990 |
| WO | 1998/011291 | 3/1998 |
| WO | 2003/032763 | 4/2003 |
| WO | 2010/091708 | 8/2010 |
| WO | 2012/052445 | 4/2012 |
| WO | 2012/121716 | 9/2012 |

OTHER PUBLICATIONS

PCT International Search Report and International Preliminary Report on Patentability for International Application No. PCT/US2014/041154 (dated Nov. 13, 2014).

PCT International Search Report and International Preliminary Report on Patentability for International Application No. PCT/US2014/041155 (dated Sep. 30, 2014).

| Test 1-5 ounce polyproplyne standard 1 ½ inch fold chain stitch - WARP | | | |
|---|---|---|---|
| | No Stitch Tensile | Chain StitchTensile | % Tensile Strength |
| | 408.9 | 237.7 | |
| | 403.3 | 242.1 | |
| | 405.1 | 248.2 | |
| | 414.0 | 231 | |
| | 390.3 | 193.7 | |
| Average – set 1 | 404.32 | 230.54 | 57.0% |
| | 378.3 | 217.4 | |
| | 393.5 | 230.2 | |
| | 403.0 | 207.3 | |
| | 378.3 | 221.1 | |
| | 393.9 | 242.8 | |
| Average – set 2 | 389.4 | 223.8 | 57.5% |
| | | | |
| Average–sets 1 & 2 | | | 57.2% |

| Test 2-5 ounce polyproplyne standard 1 ½ inch fold chain stitch - WEFT | | | |
|---|---|---|---|
| | No Stitch Tensile | Chain StitchTensile | % Tensile Strength |
| | 393.2 | 249.9 | |
| | 400.6 | 206.8 | |
| | 368.0 | 226.3 | |
| | 378.9 | 226.8 | |
| | 405.2 | 238.3 | |
| Average – set 1 | 389.18 | 229.62 | 59.0% |
| | 397.8 | 223.5 | |
| | 361.4 | 226.3 | |
| | 379.0 | 229.5 | |
| | 393.2 | 230.9 | |
| | 422.1 | 231.2 | |
| Average – set 2 | 390.7 | 228.3 | 58.4% |
| | | | |
| Average–sets 1 & 2 | | | 58.7% |

FIG. 1

| Test 3-5 ounce polyproplyne standard 1 1/2 in. fold chain stitch with 1 1/2 hem-WARP | | | |
|---|---|---|---|
| | No Stitch Tensile | Chain Stitch Tensile | % Tensile Strength |
| | 379.4 | 251.2 | |
| | 390.2 | 251.4 | |
| | 379.5 | 239.0 | |
| | 388.4 | 262.4 | |
| | 413.0 | 250.7 | |
| Average – set 1 | 390.1 | 250.9 | 64.3% |
| | 403.8 | 277.3 | |
| | 402.3 | 256.3 | |
| | 392.3 | 241.9 | |
| | 403.6 | 265.4 | |
| | 403.4 | 271.3 | |
| Average – set 2 | 401.1 | 262.4 | 65.4% |
| Average–sets 1 & 2 | | | 64.9% |

| Test 4-5 ounce polyproplyne standard 1 ½ inch fold chain stitch with 1 ½ hem- WEFT | | | |
|---|---|---|---|
| | No Stitch Tensile | Chain Stitch Tensile | % Tensile Strength |
| | 406.4 | 254.8 | |
| | 441.7 | 246.1 | |
| | 423.5 | 246.3 | |
| | 413.7 | 255.8 | |
| | 431.4 | 254.4 | |
| Average – set 1 | 423.34 | 251.48 | 59.4% |
| | 428.0 | 303.6 | |
| | 414.0 | 215.8 | |
| | 393.2 | 268.5 | |
| | 387.5 | 276.9 | |
| | 388.4 | 250.0 | |
| Average – set 2 | 402.2 | 263.0 | 65.4% |
| Average–sets 1 & 2 | | | 62.4% |

FIG. 2

| 502 FUSION TENSILE STRENGTH | | | | | | | | |
|---|---|---|---|---|---|---|---|---|
| 428 | | | | | | | | |
| #1 | | #2 | | #3 | | #4 | | |
| 400 | | 353 | | 414 | | 408 | | |
| 373 | | 407 | | 412 | | 411 | | |
| 425 | | 425 | | 413 | | 426 | | |
| 390 | | 395 | | 442 | | 382 | | |
| 434 | | 435 | | 437 | | 407 | | |
| 419 | | 412 | | 415 | | 356 | | |
| Avg 407 Drop 4.9% | | Avg 407 Drop 3.7% | | Avg 422 Drop 1.4% | | Avg 398 Drop 7% | | |

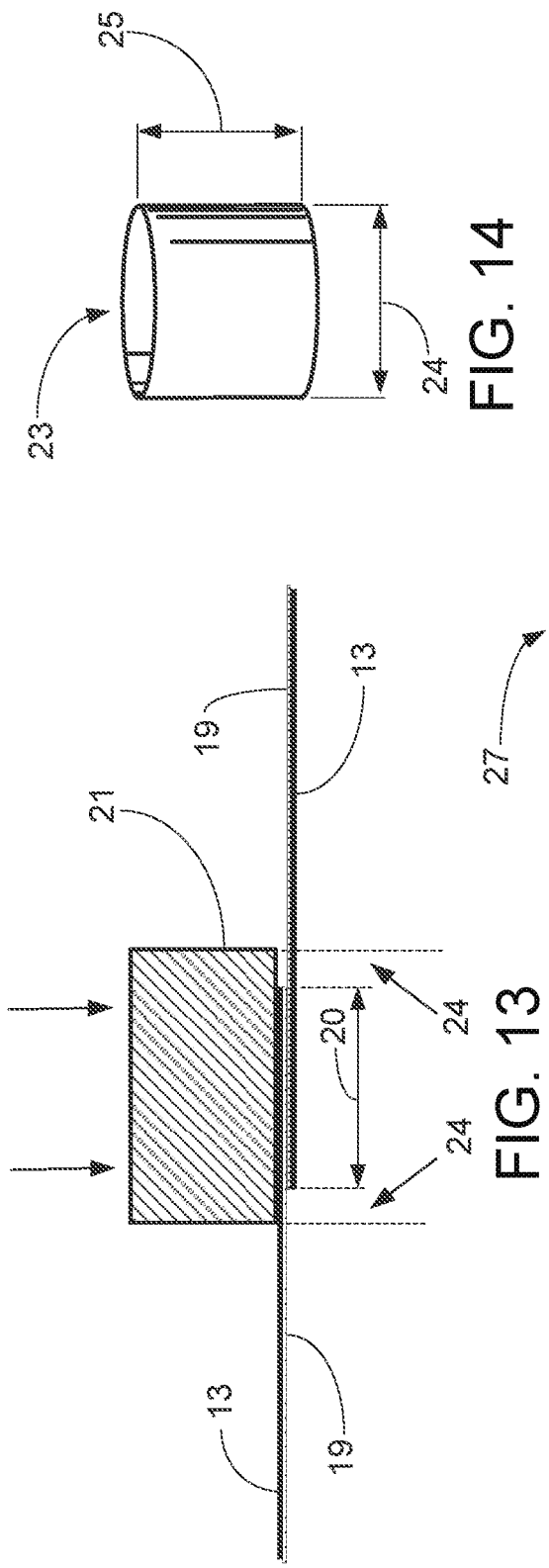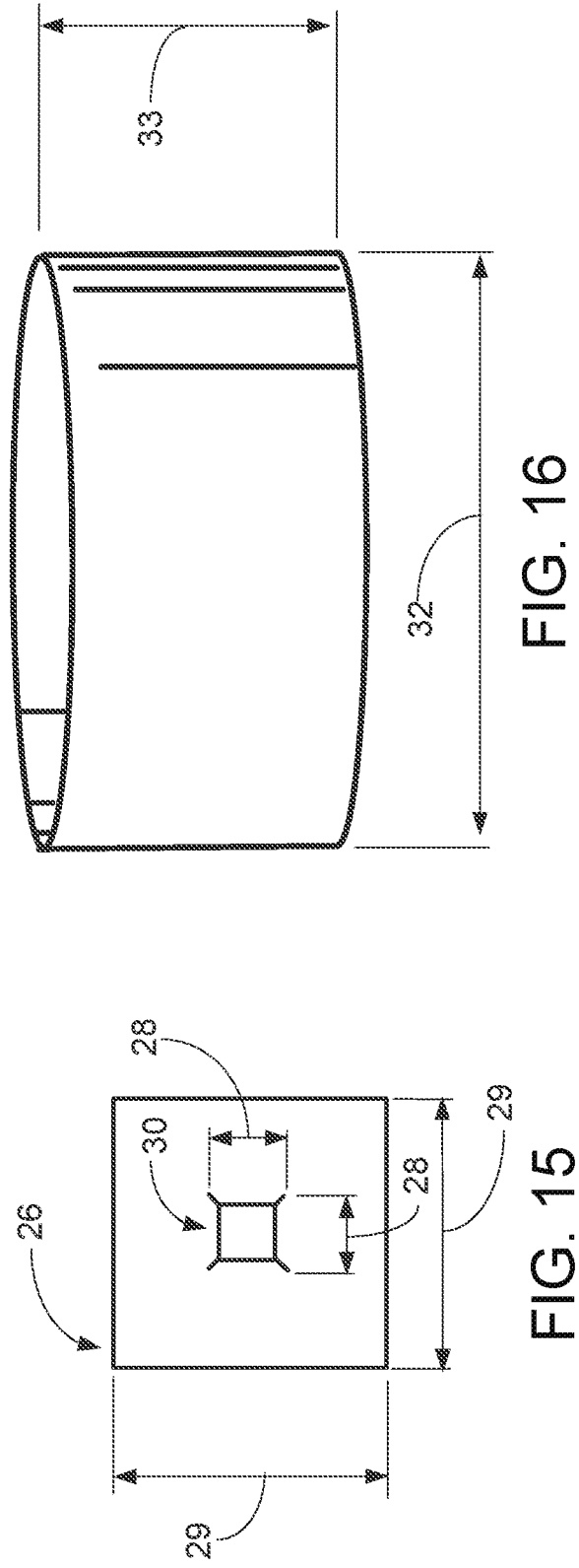

METHOD OF PRODUCTION OF FABRIC BAGS OR CONTAINERS USING HEAT FUSED SEAMS

CROSS-REFERENCE TO RELATED APPLICATIONS

This is a continuation of U.S. patent application Ser. No. 17/219,398, filed on 31 Mar. 2021 (issued as U.S. Pat. No. 11,279,523 on 22 Mar. 2022), which is a division of U.S. patent application Ser. No. 16/126,635, filed on 10 Sep. 2018 (issued as U.S. Pat. No. 10,974,869 on 13 Apr. 2021), which is a continuation of U.S. patent application Ser. No. 14/297,441, filed on 5 Jun. 2014 (issued as U.S. Pat. No. 10,112,739 on 30 Oct. 2018), which claims priority of U.S. Provisional Patent Application Ser. No. 61/831,476, filed on 5 Jun. 2013; U.S. Provisional Patent Application Ser. No. 61/890,664, filed on 14 Oct. 2013; U.S. Provisional Patent Application Ser. No. 61/909,737, filed on 27 Nov. 2013, and U.S. Provisional Patent Application Ser. No. 61/994,642, filed on 16 May 2014, each of which is hereby incorporated herein by reference.

U.S. patent application Ser. No. 14/297,331, filed on 5 Jun. 2014, is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the bulk bag industry and the art for production of bulk bags without use of sewing machines and stitched seams. The invention further relates to production of flexible fabric packaging, bags or containers without thread contamination and minimal human contact with the interior of the packaging, fabric or container to help eliminate concerns regarding bacterial contamination. The invention further relates to production of nearly air tight flexible fabric packaging, bags or containers that do not contain stitching or sewing holes.

2. General Background of the Invention

Woven polypropylene fabrics have been the fabric of choice in certain industries, including the bulk bag industry, given the strength, cost and flexibility of the fabrics. Although woven polypropylene fabrics and some similar fabrics are very strong, they are also very chemically inert. The polypropylene fabrics are highly oriented through a heating and stretching process to achieve maximum strength while maintaining the needed flexibility of fabrics to fit the needs of the marketplace. Due to these properties, it is very difficult to find a method of connecting two polypropylene fabrics without damaging the fabric itself, thereby reducing notably the strength and usefulness of the fabrics.

The Bulk Bag Industry is now over 40 years old. The very first bulk bags were constructed by combining various configurations of woven fabrics and woven webbing by sewing them together to get the needed strength.

Today, sewing remains nearly the exclusive method for connecting the materials of construction when making bulk bags. The determination of which fabrics to use and which sewing patterns and which threads to use to combine these parts to create the most economical bulk bag container are well known and have been studied in great detail.

However, the basic methods cannot produce the most economical container as the act of sewing reduces the fabric strength through the needle punctures. The average sewn seam in these high strength woven polypropylene fabrics creates seams that are generally about 63% of the strength of the unsewn fabrics.

Therefore, in order for the seams to be strong enough, the fabrics themselves must be constructed thicker and stronger to make up for the loss of strength in the seam.

Many efforts have been made to find an acceptable alternative to sewing polypropylene fabrics for several reasons.

1. The act of sewing creates thread ends that must be cut from the end of each sew line. These ends often get loose and can become unwanted contamination within the bags.

2. Because of the high heat generated by the needles passing through this tough polypropylene fabric, threads are often breaking. This causes production to momentarily stop while the machine is re-threaded.

3. Sewing machines can run at speeds of several thousand stitches per minute. At this high speed with many mechanical parts, there is a high incidence of parts breakage and needle breakage which stops production of that machine while it is repaired.

4. Because of points 2 & 3, the production of bulk bags, for example, requires a high amount of labor to operate these machines and deal with these issues. Global bulk bag production has largely taken place outside the United States, to be produced in countries with abundant sources of low wage labor.

Furthermore, even sewing seams reduce the strength of the polypropylene or other similar fabrics as the needle punctures break the fibers in the area and reduce the fabric total strength. The number of stitches in each inch or centimeter of the seam, the needle size and the thickness of the thread used to make the stitch, all play a part in the overall strength of the resulting seam. Often these seams produce a joint that is about 63 to 70% of the strength of the unstitched fabric. Due to the weakening of the fabrics, fabrics that are 30% stronger than would be theoretically needed to carry the very heavy weights that bulk bags are designed to carry may be used. For all of these reasons, an alternative to sewing has been desired and sought after within the industry for many years.

Thus, for many years, this industry has searched for an alternative to sewing as a method of bulk bag construction. Various glues and various welding methods have been tried. Contact glues have been found unsuccessful due to;

1. poor peeling strengths, 2. the lack of a permanent bond, (contact glues stay active so they can be peeled and reattached over and over)

3. a bond that is easily affected by temperature changes (glue often melts at very low temperatures and becomes inactive in cooler temperatures)

4. shear strength that is only attained with very large area type coverage.

Solvent glues have also failed due to the following;

a. joints are brittle and inflexible b. often involve hazardous elements not allowable in food packaging and c. fabric strength is reduced by molecular reconfiguration.

Heat welding has been tried and largely rejected because to heat weld as in the prior art, one must reach the melting point of the polypropylene fabrics to bond them together. However, the polypropylene fabrics are highly oriented and bringing them up to this temperature level results in a fabric tensile strength loss of approximately 50%.

Laser welding has been tried and showed some marginal success but this method is not economically feasible due to low production rates and very high capital costs.

The basic issue has always been that bulk bags must safely carry tremendous weights, for example in some cases up to 3,300 (1,497 kilograms) or 4,400 pounds (1,996 kilograms). Many prior efforts have shown that joints can be achieved but nothing in the prior art has shown itself to be able to carry the tremendous weights with the required 5 to 1 lifting safety in the resulting containers.

Therefore, after 40 years of production, sewing still remains the basic method of producing bulk bags. Bulk bags are still manufactured largely through the original methods of sewing woven polypropylene fabrics together to form the bag and its lifting components. As discussed above, polypropylene has been the primary fabric of choice due to its combination of strength, flexibility, and cost.

The art of heat sealing is well known in plastic fabric industries such as those industries using polyethylene or PVC fabrics. The prior art method has been simple. Heat the fabric up to something higher than the melting temperature of polyethylene than squeeze the fabrics parts together with enough force to squeeze any melting laminated coatings out from between the fabrics and allow the fabrics to join directly together. Heat sealing equipment is useful in that it is significantly more amenable to automation than sewing machines. It has far less moving parts and can be electronically supervised for dependable repeatability.

In the prior art, polyethylene fabrics are heated up past their melting point, then squeezed together with sufficient pressure (for example, 20 psi (137 kilopascal)) to be sure the fabrics meet and join for a pre-determined amount of time, and the joint is made. This joint is typically around 80 to 85% of the original strength of the materials. Since these materials are not so highly oriented, as compared to polypropylene, this high heat method results in an acceptable joint. In the prior art, pressure may generally be applied at approximately 20 psi (137 kilopascal) across the entire joint area to squeeze the laminations out. Heat is applied at temperatures significantly over the melting point of the polyethylene fabric so that the laminations would become liquefied and the surface of the woven portions would also become melted. The liquefied lamination was then squeezed out from between the fabrics and the melted surfaces of the fabrics themselves were used to make the joint. Example melting points of some polyethylene fabrics may be 235 or 265 degrees Fahrenheit (112.8 or 129.4 degrees Celsius). High and low density polyethylene fabrics are made in the prior art, and different polyethylene fabrics may have different melting points, wherein low density polyethylene generally has a lower melting point than high density polyethylene. Temperatures, for example, of 425 to 500 degrees Fahrenheit (218.3 to 260 degrees Celsius) are applied in the prior art to melt the laminated film and polyethylene fabric. Additionally, Polyethylene has about 30% less tensile strength than similar sized Polypropylene and a great deal greater amount of stretch. Therefore, Polyethylene has not been a useful alternative fabric when making bags to carry the great weights of bulk bags (up to 4,400 pounds (1,996 kilograms) for example).

However, polypropylene is so highly oriented that use of current or standard heat sealing procedures, which call for temperatures exceeding the melting point of the fabrics, results in the strength of the fabric itself being immensely deteriorated. Testing conducted with regard to developing the present invention has shown an average loss of tensile strength of approximately 50% when polypropylene fabric is joined through standard heat sealing methods, wherein the fabric is heated to a temperature exceeding the melting point of the fabric. This then results in joint strengths that are significantly less than joint strengths currently available through sewing polypropylene fabrics. Thicker stronger fabrics may then be preferred to be used so that the final strength of a resulting product will safely lift the required weights necessary for the product. Further, such joints produced through heat sealing polypropylene fabric with standard heat sealing methods show a measure of crystallization in the joint area which also reduces the flexibility of the fabrics in the joint areas.

There is a need in the industry to produce products comprising polyethylene fabrics with stronger heat sealed seams or joints than what is achieved by prior art methods of heat sealing polyethylene fabrics.

There is a need in the industry to produce products comprising polypropylene fabrics, including fabric bulk bags, by sealing, instead of stitching the parts or fabric pieces together, given that needles break frequently and sewing requires an operator to replace the needle and repair the stitches that were not properly applied.

There is also a need in the industry to produce products comprising polypropylene or polyethylene fabrics, including fabric bulk bags, by sealing, instead of stitching the parts together. Use of sewing machines for bulk bag production, for example, involves high amounts of labor, thread contamination will always be a possibility and powders sifting through the sewn seams will always be a concern.

While sewing machines might be able to be automated, they have not been able to run in an automated manner. Threads break as heat builds up and an operator is needed to re-string the machine with new thread. These machines operate at high speeds and often skip stitches. This requires an operator to see this quality issue and repair it right away.

The following prior art references are incorporated herein by reference.

| Pat./Publication No. | Title | Issue Date |
| --- | --- | --- |
| 6,374,579 | Liner Bag for Flexible Bulk Container | Apr. 23, 2002 |
| 6,935,782 | Bulk Bag with Seamless Bottom | Aug. 30, 2005 |
| 8,297,840 | Heat Activated Adhesives for Bag Closures | Oct. 30, 2012 |
| 2008/0115458 | Pillow Packaging Bag, Pillow Type Packaging Body, Heat Seal Bar for Pillow Packaging Machine, and Pillow Packaging Machine | May 22, 2008 |

-continued

| Pat./Publication No. | Title | Issue Date |
| --- | --- | --- |
| 2010/0209025 | Flexible Package Bag Provided with One-Way Functioning Nozzle and Packaging Structure for Liquid Material | Aug. 19, 2010 |
| 2011/0085749 | Open Mesh Material and Bags Made Therefrom | Apr. 14, 2011 |
| 2011/0206300 | Side-Gusset Bag | Aug. 25, 2011 |
| 2012/0227363 | Method and Apparatus for Top Sealing Woven Bags | Sep. 13, 2012 |
| 2012/0314979 | Bag and Method of Manufacturing a Bag | Dec. 13, 2012 |
| 2013/0202231 | Composite Film Bag for Packaging Bulk Products | Aug. 8, 2013 |
| 2013/0209002 | Easy Open Plastic Bags | Aug. 15, 2013 |

BRIEF SUMMARY OF THE INVENTION

The apparatus and method of the present invention solves the problems confronted in the art in a simple and straightforward manner. What is provided is an alternative method of connecting woven polypropylene fabrics, or similar fabrics without the use of sewing machines and sewing threads. Also provided is a method for connecting polyethylene fabrics without use of sewing machines and sewing threads. The present invention is useful in the production of bulk bags, and will also will apply to any product for which one wishes to connect polypropylene fabrics, polyethylene fabrics, or similar fabrics without the use of sewing machines. This invention also relates to the ability to produce products involving connecting polypropylene fabrics or similar fabrics, including bulk bags, with minimal labor, thereby allowing such products to be made in all areas of the world where the products are needed, versus only being produced in volume in those areas of the world with large amounts of low wage labor.

An object of the present invention is thus to provide an alternative to sewing polypropylene or other similar fabrics in producing bulk bags and other flexible fabric products or containers. The present invention seeks to provide an alternative method of connecting woven polypropylene fabrics or similar fabrics without the use of sewing machines and sewing threads. While this invention is useful in the production of bulk bags, it will apply to any product that wishes to connect polypropylene fabrics or similar fabrics without the use of sewing machines. For Example, the present invention may be also useful with smaller bags (for holding 25 to 100 pounds (11 to 45 kilograms)).

Another object of this invention is to design a sealing system that can utilize simple robots for automation in the construction of flexible fabric containers.

It is a further object of the present invention that a flexible fabric bag or product made by heat sealing versus sewing will have many advantages as follows, Lower wage content, reduced or eliminated sewing thread contamination, new needle holes to allow sifting of product out or moisture and contamination in, a more consistent quality controlled by computerized production rather than being hand made with all the attendant consistency issues such a method creates.

It is a further object of the present invention that the flexible fabric products made by heat sealing will have great marketplace appeal for those companies for whom any thread contamination would jeopardize the quality of their product. Such companies would be in the food or electronics or medical or pharmaceutical industries. These bags would have no threads to endanger things as there would be no sewing.

It is a further object that the present invention to provide a flexible fabric product would have great appeal to those companies who are concerned about sifting of their product through the needle holes left by the sewing process. Such companies may include the carbon black companies, where very tiny amounts of their product can make very large messes. Other companies may include companies whose products are going into sensitive end user environments where small amounts of their products would contaminate the area.

It is a further object of the present invention to provide a flexible fabric product that would not require a polyethylene liner. This would be useful for companies who are using polyethylene liners to prevent sifting and contamination. Liners make bulk bags, for example, more difficult to work with and add a notable amount of cost to the overall product.

It is a further object that the present invention to provide a method that allows companies to pursue full automation for woven fabric product production.

It is a further object of the present invention to provide heat sealed joints with minimal damage of the original fabric for allowing lower costs through facilitating automated production to reduce labor costs, and also facilitating reduction of fabric weights and thicknesses while providing similar overall strengths through higher seam efficiencies.

It is a further objective of the present invention to use heat sealing equipment, which can be automated, to produce polypropylene products without requiring stitched seams or sewing machines. It is also an objective of the present invention to use heat sealing methods to produce products comprising fabrics similar to polypropylene, without requiring stitched seams or sewing machines.

Another objective of the present invention is to facilitate a robotic or automated system for production of large fabric bags, for example polypropylene bulk bags or barrier cells, for forming a flood barrier, for example, when filled with sand or the like, using robots or other automated system.

A further objective of the present invention is to provide a heat sealed polypropylene product that may be manufactured without human touch on the inside of the product, so as to maintain a sterile product and help eliminate a concern regarding bacterial contamination of polypropylene storage products, as well as to eliminate the possibility of leakage through sewing holes, so that the product may be used in medical applications, for example in the pharmaceutical industry.

In developing the present invention, testing and experimentation was conducted. For example, testing and experimentation with heat sealing polypropylene fabric was conducted. Test results showed that these fabrics are highly oriented for strength. This high orientation and the molecular structure of polypropylene made efforts to connect two pieces of this material difficult. To join polypropylene pieces of fabric required such a level of heat that the polypropylene fabric simply crystallized making it brittle and not helpful for the purpose of lifting great weights, a purpose for which bulk bags, for example are routinely used.

Besides crystallizing the fabric, heat sealing polypropylene fabric using standard procedures known in the art resulted in seams with two distinctly different strengths. In seaming operations, including when sewing, there exists a "shear strength" and a "peel Strength". For example, the lift loops sewn to the side walls of a bulk bag have amazing strength when pulled straight up as this motion utilizes the shear strength of this joint, where the entire joint is sharing the load at all times. But if the bag is lying on its side and it is picked up by one loop, the joint is temporarily put into a position where the peel strength becomes critical, where one edge of the joint is attacked. Thus in shear strength position, the entire joint is sharing the load at all times. In the peel strength position, only one edge of the joint is attacked or bearing the load. As that edge fails, the next edge and then the next edge fail in sequence.

This peel versus shear strength issue was considered when experimenting with heat sealing polypropylene fabric, for constructing bulk bags for example, because any interior panel that may be installed via heat seal in a bulk bag may be attacked by fill material weight from either side. It is also difficult to control all filling situations in the field. An object of the present invention is to create a seam that will work in both directions. An object of the present invention was also to develop different seam configurations that would always have shear strength working for it.

When testing panels for inside a fabric container, for flood wall use for example, an upside down "T" shape seam construction was developed and used. Testing revealed that if the force came from the right side of the 'T' the right side of the seal or joint would be in shear and the left side would be in peel. But the right side would protect the left side with all of its sheer strength. If the load or force came from the left side the seam would work in reverse with the sheer strength on the left protecting the peel on the right.

In further testing conducted with polypropylene fabrics, different glues were tested for making usable joints with polypropylene fabric. Test results using Super Glue showed that Super glue did not achieve a 20 pound (9 kilogram) shear strength.

Testing was also conducted using different types of fabric. Polyethylene fabric is similar to polypropylene but is not as highly oriented and many products comprising polyethylene have been made using standard heat sealing methods.

Testing and experimentation with polyethylene fabric showed that polyethylene fabrics were generally about 30% weaker than polypropylene fabrics. Testing was performed with regard to heat sealing polyethylene fabric to produce a bulk bag. As previously discussed, polypropylene fabric has been preferred in the bulk bag industry given its higher strength.

The prior art methods of heat sealing generally involve high enough heat and high enough applied pressure to melt the basic fabrics and join them together. This method purposefully, melts any applied coating and squeezes it aside through the high pressure levels so that the base woven materials can be joined together. This method has been successful, with polyethylene fabrics and was necessary because the strength being relied upon came from the woven fabrics. The coatings were generally applied for the purpose of providing dust and/or moisture control. The technology at the time for applying the laminations did not provide dependably strong attachments of the coating to the fabric itself. Therefore, the art of joining the fabrics intentionally melted away the laminated materials by melting them and squeezing them out from between the fabrics.

In the prior art, the standard method discussed above has been applied to woven fabrics that have a thin layer of laminated film on at least one side, for example a 1 or 2 mil (0.0254 or 0.0508 mm) layer. For polyethylene fabrics standard laminated film or coating is often comprised of polyethylene, or a mixture of polyethylene and other additives. Standard prior art methods apply pressure to squeeze the laminated film or coating out from between the layers of polyethylene fabric, to allow the fabric pieces to melt and join together. Traditionally in the art, the laminated film or coating was not very securely attached to the woven fabrics. Therefore, if the joint included the laminated film itself, the lamination became the cause of the joint failure because of its weak attachment to the woven fabrics.

To determine a joint strength, laminated woven fabrics may be tensile tested before being joined to get a baseline strength of fabric. For example, a fabric may break at 200 lbs per inch (3,572 kilograms per meter) in its raw state. Then two pieces of this fabric may be joined and then pulled to destruction again. A resulting strength, for example, of 160 to 165 pounds per inch (2,857 to 2,946 kilograms/meter) would mean that a resulting joint would have lost 17 to 20% of the total fabric strength as a result of being sealed together. While this joint strength may be sufficient based on current industry standards, it still represents a significant cost of inefficiency.

In an embodiment of the method of the present invention, the method provides a heat fused joint between pieces of polyethylene fabric by joining the laminations rather than by joining the fabrics. Current laminating methods now produce a cling or connection rate between the woven fabric and the lamination that is very strong and dependable. By leaving the lamination in place between the fabrics and not joining the fabric pieces, the improved sealing method of the present invention adds the strength of the lamination to the total strength of the joint. Additionally, since the method of the present invention does not damage the fabric by melting the woven portions, the sealed joint retains virtually all of the base woven fabrics strength. The small percentage of strength lost, for example two or three percent of strength that may be lost, is the result of minimal damage to the laminated film through melting and fusing that occurs in the present method.

In the prior art, pressure may generally be applied at approximately 20 psi (137 kilopascal) across the entire joint area to squeeze the laminations out. Heat is applied at temperatures significantly over the melting point of the polyethylene fabric so that the laminations would become liquefied and the surface of the woven portions would also become melted. The liquefied lamination was then squeezed out from between the fabrics and the melted surfaces of the fabrics themselves were used to make the joint. Example melting points of some polyethylene fabrics may be 235 or 265 degrees Fahrenheit (112.8 or 129.4 degrees Celsius). High and low density polyethylene fabrics are made in the prior art, and different polyethylene fabrics may have different melting points, wherein low density polyethylene generally has a lower melting point than high density polyethylene. Temperatures, for example of 425 to 500 degrees Fahrenheit (218.3 to 260 degrees Celsius) are applied in the prior art to melt the laminated film and polyethylene fabric.

An embodiment of the method of the present invention comprises joining polyethylene fabrics using controlled heat, time and pressure amounts that leave the base or woven materials unmelted and undamaged yet still melting the laminations. The pressure levels are kept light enough to leave the lightly melted lamination in place rather than to purposefully squeeze it out from between the woven portions of the joint.

Another embodiment of the present invention comprises a method of heat sealing polyethylene fabric comprising joining polyethylene fabrics using controlled heat, time and pressure amounts that leave the base or woven materials unmelted and undamaged yet still melting the laminations.

In another embodiment of the method of heat sealing polyethylene fabric, the pressure levels are kept light enough to leave the lightly melted lamination in place rather than to purposefully squeeze it out from between the woven portions of the joint.

In another embodiment of the method of heat sealing polyethylene fabric, seals provide 90% to 97% joint strengths in the shear direction.

In another embodiment of the method of heat sealing polyethylene fabric, the seal comprises a strength of 92 to 95%.

In another embodiment of the method of heat sealing polyethylene fabric the seal comprises a strength of 96 to 97%.

In another embodiment of the method of heat sealing polyethylene fabric, the method comprises heating a laminated film or coating on polyethylene fabric pieces right at or barely above the melting point of the polyethylene fabrics so that only the lamination is melted and liquefied. Then light pressures, for example 5 to 6 psi (34 to 41 kilopascals), are used to join the laminations of the fabric pieces together, rather than to push them away and join the underlying fabrics. In another embodiment of the method of heat sealing polyethylene fabric, the method provides a heat fused polyethylene seal or joint with 90 to 97% strength, as compared to the strength of the original fabric.

Another embodiment of the present invention comprises heat fusing polyethylene fabrics to produce a bulk bag. In an embodiment of the polyethylene bulk bag of the present invention, the bag would not include lift loops but would include fabric tunnels which would use the strength of the entire bag fabrics for lifting versus the lift loop bags that use only a small portion of the fabric for lifting. Testing results for an embodiment of the present invention, showed that a heat sealed bulk bag built out of polyethylene fabric held over 18,000 lbs (8,165 kilograms) of hydraulic pressure before failing. On a 5 to 1 safety ratio, this bag could be useful for applications that carry up to 3600 lbs (1,633 kilograms). In this embodiment, the method used all of the fabric on two sides of the bag. Further, the fabric was doubled so the heat seal would be on the bottom of the bag and protected from any potential peeling forces. Although the heat fused polyethylene bag had nearly 50% more materials, this embodiment of the bag, still eliminated a lot of the labor associated with producing fabric bulk bags via sewing methods.

In another embodiment of the method of heat sealing polyethylene fabric, impulse heat sealing equipment is used to deliver controlled amounts of heat for controlled amounts of time to specified portions of the fabric which result in a two inch wide seal. In another embodiment of the method of heat sealing polyethylene fabric, these seals provide 90% to 97% joint strengths in the shear direction.

In another embodiment of the method of heat sealing polyethylene fabric, heat sealing equipment may be automated, and sensors can be attached to monitor time, heat, and pressure. These readings can transfer to a watch station in a control room. Robots can move the materials from work station to work station and fabric can be positioned and sealed robotically.

In another embodiment of the method of heat sealing polyethylene fabric, using relatively low heat and low pressure, only the coating itself is being joined. This leaves the fabric completely undamaged and unweakened. In fact, the strength of the coating now adds to the overall joint strength rather than being squeezed out in the current methods. With the resulting joint strengths, one is now able to lift greater weights with less material than can be done with the current, commonly used methods of sewing fabrics together.

When developing an embodiment of a heat sealed polyethylene bulk bag, the following factors were considered. First, there are many changes in direction and different or special shapes for heat sealing equipment may be needed for production of bulk bags. Second, safety levels for polyethylene bulk bags would preferably be similar to the safety levels of polypropylene fabric bulk bags, which are 30% stronger.

When testing an embodiment of a heat sealed polyethylene bulk bag, the results showed 93% joint efficiency.

In an embodiment of a polyethylene bulk bag of the present invention, the lift loops were eliminated and replaced with fabric tunnels which would use the strength of the entire bag fabrics for lifting versus the lift loop bags that use only a small portion of the fabric for lifting.

Experimental models were constructed to identify and evaluate any practical issues. In one embodiment, test results showed that a heat sealed bulk bag built out of polyethylene fabric held over 18,000 lbs (8,164 kg) of hydraulic pressure before failing. On a 5 to 1 safety ratio, this bag could have been sold for applications that carried up to 3,600 lbs (1,632 kg). In this embodiment, the method used all of the fabric on two sides of the bag. Further, the fabric was doubled so the heat seal would be on the bottom of the bag and protected from any potential peeling forces. This meant that the heat fused polyethlene bag had nearly 50% more materials. This embodiment of the bag, however, still eliminated a lot of the labor associated with producing fabric bulk bags via sewing methods.

An embodiment of the method of the present invention is a method to produce bulk bags or any flexible fabric container comprising polypropylene fabrics in a manner that can result in joints that are heat sealed in such a manner that the natural stresses on each heat sealed joint will be applied to the joint or seam in the sheer direction for the greatest strength. In the preferred embodiment a method of producing poplypropylene bulk bags would utilize a mixture of a minimum of 70% pure VERSIFY™ 3000 (Trademark of The Dow Chemical Company) and 25% Polyethylene, and 5% other additives such as pigments or Ultra Violet (UV) inhibitors. Other potential additives may include anti-static protection. Properly sealed, this system will produce heat sealed joints resulting in an average joint strength of 92% of the strength of standard 5 ounces per square yard (169.53 grams per square meter) woven polypropylene.

Another embodiment of the present invention comprises a method of joining highly oriented polypropylene woven fabrics by the following steps: coating the fabrics with materials, wherein one piece of fabric to be joined is coated with materials comprising VERSIFY™ 3000, which has a melting point lower than the polypropylene fabric, and wherein the other piece of fabric to be joined is coated with a standard industry coating; heating the coating comprising VERSIFY™ 3000 to its lower melting point; and joining the coatings with pressure light enough to allow the coating to stay in place and generally keep the woven fabrics from touching.

In an embodiment of the present invention, the strength of the coating adds to the overall joint strength, and resulting joint strengths, allows one to lift greater weights with less material than can be done with the current, commonly used methods of sewing fabrics together.

In another embodiment of the present invention, a coating comprising a suitable percentage of VERSIFY™ 3000, or other suitable propylene elastomer or plastomer coating with a melting point lower than the melting point of the polypropylene fabrics, will be applied to at least one side of one piece of polypropylene fabric and a standard industry coating will be applied to at least one side of another piece of polypropylene fabric. Standard industry coatings for polypropylene fabric generally comprise a majority percentage of polypropylene and a small percentage of polyethylene. The piece of fabric comprising the VERSIFY™ 3000 coating, or other suitable propylene elastomer or plastomer with a melting point below the melting point of the polypropylene fabric, will be positioned to overlap the piece of fabric comprising the standard coating, and positioned so that the coating layers are in contact. Low heat and low pressure will be applied to melt the coating and form a joint between the coatings of the polypropylene fabric. This embodiment of the present invention is cost effective because standard coatings cost less than coating comprising VERSIFY™ 3000, for example. Testing results have shown similar seam strengths when joining one fabric comprising a VERSIFY™ 3000 coating and joining another fabric comprising a standard coating. A notable amount of money may be saved as the standard coating is far less expensive. In a preferred embodiment both the VERSIFY™ coating, or other suitable propylene elastomer or plastomer with a melting point below the melting point of the polypropylene fabrics, and the standard coating will be applied to a 2.5 mil (0.0635 mm) thickness. In a preferred embodiment of the present invention, the coating is applied at a 2.5 mil (0.0635 mm) thickness. Generally in the prior art, standard industry coatings are applied at 1 mil (0.0254 mm) thickness.

In an embodiment of the method of the present invention, the method is for creating a new form of heat welding seam for polypropylene fabrics that provides as high as 95% seam strength in the shear position. An objective of the present invention is to use that seaming method to create a safely improved bulk bag that is competitive in the marketplace.

Another embodiment of the method of producing flexible fabric bags, comprising the steps of coating a polypropylene fabric with 100% VERSIFY™ 3000 or a combination VERSIFY™ 3000 and polyethylene, and joining the fabrics (not specifically just edges) using a combination of heat and minimal pressure in such a manner that the only the coatings are welded together and not the fabrics. Thus producing a joint that will have a strength greater than the original uncoated fabric.

An embodiment of the method of the present invention comprises using heat to combine the laminated coatings of the fabrics versus trying to combine the fabrics themselves. Since the coatings have a marginally lower melting point then the fabric itself, this invention joins polypropylene fabrics without damaging the tensile strength of the original fabrics.

In an embodiment of the present invention, impulse heat sealing equipment is used to deliver controlled amounts of heat for controlled amounts of time to specified portions of the fabric which result in a 2 inch (5.08 cm) wide seal. In an embodiment of the present invention, these seals provide 85% to 96% joint strengths in the shear direction.

In an embodiment of the present invention, heat sealing equipment may be automated, and sensors can be attached to monitor time, heat, and pressure. These readings can transfer to a watch station in a control room. Robots can move the materials from work station to work station and fabric can be positioned and sealed robotically.

An embodiment of the method of the present invention enables production of a robotically manufactured bulk bag that has very little labor, wherein the bulk bags will not have human touch on the inside of the bag so as to prevent human bacteria contaminations.

An embodiment of the present invention comprises a robotic or automated system for production of large fabric bags, for example polypropylene bulk bags or barrier cells, for forming a flood barrier, for example, when filled with sand or the like using robots or other automated system.

Another embodiment of the present invention comprises a simple robotic or automated system that may fit into a 40 foot export container, or other suitable transportation means, that one could then take to any potential flood site or project site and start producing 500 foot lengths of fabric bags or containers or cells on site, for example. The robotic or automated system would be similar to a system used to make endless rain gutters for homes and apartments, for example. In another embodiment of the present invention, the automated or robotic system would also enable production of other polypropylene or similar fabric products on site, in various length measurements as may be suitable for a particular purpose or project.

In another embodiment of the present invention, what is provided is a method of producing a flexible fabric bags, comprising the steps of coating a polypropylene fabric bags with heat fused seams comprising: a combination of VERSIFY™ 3000, or other propylene elastomer or plastomer with a melting point below the melting point of the polypropylene fabric, and comprising polyethylene; providing fabric pieces, wherein each fabric piece has a coated side and an uncoated side; positioning fabric pieces so that a coated side of one fabric piece faces a coated side of another fabric piece, selecting an area of fabrics to be joined for forming one or more seams or joints and applying heat to the coated fabric at the joint under a pressure of area to be joined that is less than 2 psi (13.8 kilopascal), to form a joint with at least a 90% joint efficiency in a joint tensile test.

Another embodiment of the method of producing flexible fabric bags, comprises the steps of coating a polypropylene fabric with a combination of VERSIFY™ 3000, or other suitable propylene elastomer or plastomer with a melting point below the melting point of the polypropylene fabric, and polyethylene; joining edges of the coated fabric, applying heat to the coated fabric at the joint under a pressure of less than 2 psi (13.8 kilopascal), to form a joint with at least a 90% joint efficiency in a joint tensile test.

Another embodiment of the method of producing flexible fabric bags, comprises the steps of coating a polypropylene fabric with 100% VERSIFY™ 3000, or other suitable propylene elastomer or plastomer with a melting point less than melting point of the polypropylene fabric, or coating the fabrics with a combination VERSIFY™ 3000, or other suitable propylene elastomer or plastomer with a melting point below the melting point of the polypropylene fabric, and polyethylene, and joining the fabrics (not specifically just edges) using a combination of heat and minimal pressure in such a manner that only the coatings are welded together and not the fabrics, thus producing a joint that will have a strength greater than the original uncoated fabric.

In another embodiment of the present invention, all weight bearing points in the flexible bag are designed so that the welded joint will be stressed in the sheer direction when the bag is being properly used.

In another embodiment of the present invention, if lifting loops are provided, the lifting loops are further protected against peel forces with an additional piece of protective piece of material applied over the top portion of the lift loop seam to protect against peel pressures.

An embodiment of the present invention comprises a method of producing a flexible polypropylene fabric bags with heat fused seams comprising: providing fabric pieces, wherein each fabric piece has a coated side and an uncoated side; positioning fabric pieces so that a coated side of one fabric piece faces a coated side of another fabric piece; selecting an area of fabrics to be joined for forming one or more seams or joints; applying heat to the area to be joined that is less than the melting point of the fabrics, for forming one or more seams or joints.

In another embodiment of the method of the present invention, the seams or joints between pieces of fabric are formed one at time, to produce a flexible polypropylene fabric bulk bag.

In another embodiment of the method of the present invention, the seams or joints between fabric pieces are joined in a single step to produce the main body of the flexible polypropylene fabric bulk bag.

In another embodiment of the method of the present invention, the seams or joints of the flexible polypropylene fabric bulk bag retain at least 85% of the fabric strength without using sewing machines.

In another embodiment of the method of the present invention, the seams or joints of the flexible polypropylene fabric bulk bag retain at least 90% of the fabric strength.

In another embodiment of the method of the present invention, the seams or joints of the flexible polypropylene fabric bulk bag retain at least 96% of the fabric strength.

In another embodiment of the method of the present invention, retain at least 100% of the fabric strength without using sewing machines.

In another embodiment of the method of the present invention, for each seam or joint, a joined coated portion of one fabric piece forms a half of one seam or joint, and a joined coated portion of another fabric piece comprises a second half of the same seam or joint.

Another embodiment of the present invention comprises a method of producing flexible fabric bags with heat fused seams in a single step, comprising: a. providing 8 layers of flexible fabric, including: i. a top layer for a top panel, having a flat side; ii. a second layer for a body panel, having a flat side; iii. a third layer for a body panel, having a gusset side; iv. a fourth layer for a top panel, having a gusset side; v. a fifth layer for a top panel, having a gusset side; vi. a sixth layer for a body panel, having a gusset side; vii. a seventh layer for a body panel, having a flat side; viii. an eighth layer, for a top Panel having a flat side; b. wherein the layers of fabric comprise a layer of coating; c. positioning the layers of flexible fabric so that all areas intended to be joined have coating facing coating and all areas intending not to be joined are uncoated fabrics facing uncoated fabrics; d. positioning the layers of fabric so that there is an overlap of the fabric layers; e. centering the overlapped portions of fabric under seal bar; and f. applying low heat and low pressure to create heat fusion seams.

In another embodiment, the coated area is substantially coextensive with one side of the fabric portion.

In another embodiment of the method of the present invention, the method comprises pulse heating.

In another embodiment of the method of the present invention, heat is applied from top and bottom directions to the flexible layers of fabric.

In another embodiment of the method of the present invention, heat is applied from one direction to the flexible layers of fabric.

Another embodiment of the present invention comprises, a polypropylene container comprising heat fused seams, wherein the seams comprise a 'T' shape, and wherein the right side of the "T" seam in a shear position enables protection of the left side in a peel position when force is applied in the right direction, and wherein the left side of the "T" seam in a shear position enables protection of the right side in a peel position when force is applied in the direction of the left side.

Another embodiment of the present invention comprises a method of automated production for producing flexible fabric bags with heat fused seams comprising: a. providing layers of flexible fabric, including tubular flexible fabrics, wherein some layers are gusseted and some layers are flat, and wherein the layers of flexible fabric comprise a layer of coating; b. positioning the layers of tubular flexible fabric so the gusseted layers comprise coating on the outside and the flat fabric layers comprise coating on the inside of their gussets; c. positioning the layers of fabric so that one layer overlaps an adjacent layer; and d. applying low heat and low pressure to the overlapped portions of the layers of fabric to create heat fusion seams.

Another embodiment of the method of producing flexible fabric bags with heat fused seams comprises: a. providing fabric pieces, wherein each fabric piece has a coated side and an uncoated side; b. applying heat that is less than the melting point of the fabric pieces to be joined for joining fabric pieces to create one or more seams or joints wherein for each seam or joint, a coated side of one piece of fabric will form a half of the seam and will face a coated side of another piece of fabric for forming the other half of the seam.

In another embodiment of the present invention, the one or more joints have a joint strength equal to or greater than 85% of the fabric.

In another embodiment of the present invention, the one or more joints have a joint strength equal to or greater than 85% of the fabric without using sewing machines.

In another embodiment of the present invention, the overlapped portions of fabric is 1½ (3.81 cm) inches and the overlapped portions of fabric are centered under a 2 inch (5.08 cm) wide seal bar.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1-2 are charts showing comparative data from test results on prior art seams for bulk bag construction using standard sewing seam methods on both weft and warp direction yarns of the fabric;

FIG. 13 illustrates use of a heat seal bar in an embodiment of the heat fusion seal method of the present invention;

FIG. 14 illustrates a fill or discharge spout of an embodiment of a heat fusion seal bag of the present invention;

FIG. 15 illustrates a top or bottom panel of an embodiment of a heat fusion seal bag of the present invention;

FIG. 16 illustrates a tubular body panel of an embodiment of a heat fusion seal bag of the present invention;

DETAILED DESCRIPTION OF THE INVENTION

Figure 3:
FIG. 3 illustrates a simple sewn seam of the prior art.

In the method of the present invention, what is provided is a heat sealing method that does not substantially damage the strength of the polypropylene fabric yet still gets a final joint strength equal to or exceeding the strength of the current sewing methods. During testing, products produced using the method of the present invention have achieved joint strengths of 90 to 102% of the strength of the polypropylene fabrics which is considerably above the joint strengths of seams achieved through sewing.

In an embodiment of the present invention, the invention will aid and enable the automation of bulk bag production, thus freeing up the location of factories around the world. Due to the improved joint strength, this invention will enable the use of thinner materials to accomplish the lifting of similar weights.

In an embodiment of the present invention, a suitable coating, for example VERSIFY™ 3000, a product produced by The Dow Chemical Company is applied to the polypropylene fabrics or similar fabrics, and provides up to 240 lbs of hold or grip per lineal inch (4,286 kilogram/meter) (to the polypropylene fabric from a heat seal of 1½ inches (3.81 cm) across the joint area. In another embodiment, a coating, for example VERSIFY™ 3000, a product produced by The Dow Chemical Company is applied to the polypropylene fabrics or similar fabrics, and provides up to 200 lbs of hold or grip per lineal inch (3,572 kilogram/meter). In a preferred embodiment, the coating has a melting point which is lower than the melting point of the fabrics being joined together. The method of heat sealing is an improvement over the known art in the woven fabrics industry today.

A suitable coating may be a propylene plastomer and elastomer, for example Versify™ 3000. The coating may contain for example 50% to 90% polypropylene based polymer and 10%-50% polyethylene, by weight.

In a coating to be used in a preferred method of the present invention for heat joining polypropylene fabric, one can use 10-99%, preferably 20-95%, more preferably 30-95%, and most preferably 75-90% propylene plastomers, elastomers, or combinations thereof;

one can use 0-5% additives for color, anti-static, or other purposes (these do not materially affect the performance of the coating, and are typically minimized as they are more expensive than the propylene and polyethylene);

the balance is preferably polyethylene plastomers, elastomers, or combinations thereof.

Preferably, the propylene plastomers, elastomers, or combinations thereof have a density of 0.915 to 0.80 grams per cc, and more preferably 0.905 to 0.80 grams per cc. Preferably, the polyethylene plastomers, elastomers, or combinations thereof have a density of 0.91 to 0.925 grams per cc. Typically, one should use at least 5% low density polyethylene to make the coating run, and preferably at least 10%.

Example

In a preferred embodiment of the present invention, the fabrics are only being heated to the melting point of the coating which is lower than the melting point of the fabrics being joined together. In a preferred embodiment of the present invention, the joining temperatures are at least 5 degrees less than the melting point of the polypropylene fabrics to be joined. Different polypropylene fabrics will have different melting points, and in an embodiment of the method of the present invention, the joining temperatures are at least 5 degrees less than the melting point of the particular polypropylene fabrics to be joined. An example polypropylene fabric may have a melting point of 320 degrees Fahrenheit (176.7 degrees Celsius), and thus in an embodiment of the present invention, the coating will be heated to 315 degrees Fahrenheit (157.22 degrees Celsius). By using a lower heat than the polypropylene fabrics, the method of the present invention does not damage or reduce the strength of the fabric as typically happens when using the prior art high heat formulas for heat welding. Further, in an embodiment of the present invention, the clamping pressure used to make the seal is designed to be low enough (for example 7 psi (48 kilopascal)) to leave the coating largely in place and the materials to be joined, largely separated by the coatings. Clamping pressures may also be lower, for example under 2 psi (13.8 kilopascal). Typically in the prior art heat sealing methods, the clamping process is designed to purposefully melt and push aside any coatings on the fabric and join the fabric yarns directly. When any part of the fabric yarns are heated to and past their melting point and that is combined with high pressure (for example 20 psi (137.9 kilopascal)), the yarns are thinned out, weakened and partially crystallized.

It is an objective of the present invention to heat fuse fabrics together. In a preferred embodiment of the present invention, fabrics are not being heated up past their melting points, which is useful in preventing degradation of the strength of the fabric. In a preferred embodiment of the present invention, the fabrics are only being heated to the melting point of the coating which is lower than the melting point of the fabrics being joined together. In an embodiment of the present invention, the joining temperatures are at least 5 degrees less than the melting point of the polypropylene fabrics to be joined. Different polypropylene fabrics will have different melting points, and in an embodiment of the method of the present invention, the joining temperatures are at least 5 degrees less than the melting point of the polypropylene fabrics to be joined. (An example polypropylene fabric may have a melting point of 320 degrees Fahrenheit (176.7 degrees Celsius), and thus in an embodiment of the present invention, the coating will be heated to 315 degrees Fahrenheit (157.22 degrees Celsius)). By using a lower heat than the polypropylene fabrics, the method of the present invention does not damage or reduce the strength of the fabric as typically happens when using the prior art high heat formulas for heat welding. Further, in an embodiment of the present invention, the clamping pressure used to make the seal is designed to be low enough (for example 7 psi (48 kilopascal)) to leave the coating largely in place and the materials to be joined, largely separated by the coatings. Clamping pressures may also be lower, for example under 2 psi (13.8 kilopascal). Typically in the prior art heat sealing methods, the clamping process of the prior art is designed to purposefully melt and push aside any coatings on the fabric and join the fabric yarns directly. Naturally, when any part of the fabric yarns are heated to and past their melting point and that is combined with high pressure (for example 20 psi (137.9 kilopascal)), the yarns are thinned out, weakened and partially crystallized.

In the present invention, using low heat and low pressure, only the coating itself is being joined. This leaves the fabric completely undamaged and unweakened. In fact, the strength of the coating now can add to the overall joint strength rather than being squeezed out in the current methods. With the resulting joint strengths, the present invention enables lifting of higher weights with less material, than can be done with the prior art methods of sewing fabrics together.

As previously, discussed, in a preferred embodiment, the coating materials have a melting point lower than the fabrics to be joined. In a preferred embodiment, the coating materials in the process may be any suitable material or materials which may be used to successfully carry out the process, and could be selected from a range of coating materials. A suitable coating, for example, may be a propylene plastomer and elastomer, for example VERSIFY™ 3000, a product produced by The Dow Chemical Company. A suitable coating may contain 50% to 90% polypropylene based polymer and 10%-50% polyethylene, by weight. VERSIFY™ is a registered trademark of The Dow Chemical Company for propylene-ethylene copolymers used as raw materials in the manufacture of films, fibers and a wide variety of molded plastic objects; propylene-ethylene copolymers used as raw materials in the manufacture of compounds to make coated fabrics, artificial leather, soft touch grips, shoe stiffeners and flexible roofing membranes.

In a preferred embodiment of the present invention, the method would utilize a mixture of a minimum of 70% pure VERSIFY™ 3000 and 25% Polyethylene and 5% of additives such as UV protection and colors. Using 100% pure VERSIFY™ 3000, the method of the present invention achieved up to 96% to 102% joint efficiency in a shear joint tensile test, while at 70% VERSIFY™ 3000, 91% to 95% joint efficiency has been obtained in the same test. (The resulting percentages are based on the average strength of the fabric tested. There is generally approximately a 5% variable strength in any section of fabric tested.)

Figure 4:
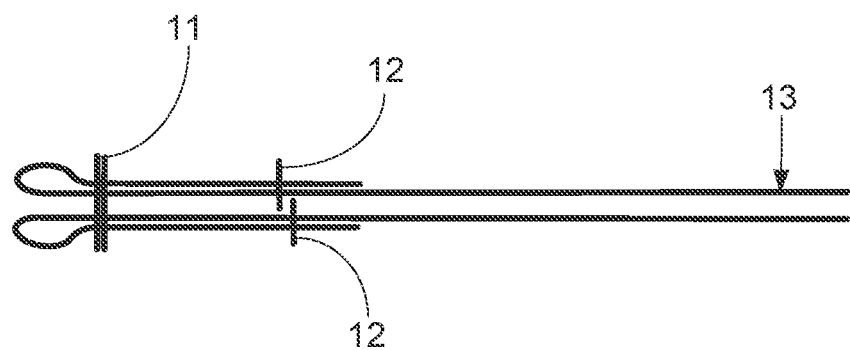
FIG. 4 illustrates a pre-hemmed sewn seam of the prior art.

Turning now to the figures, the charts shown in FIGS. 1-2, illustrate comparative data and results from testing performed on seams made for bulk bag construction using both the standard sewing seam methods on both weft and warp direction yarns of the fabric. They are several ways to make prior art seams in the bulk bag industry. In FIGS. 3-4, the most common seams are depicted.

FIG. 3 depicts a simple sewn seam. In FIG. 3, fabric 13 is shown, with sewing stich seam 11, and fabric fold 15, wherein fabric is folded back on itself to create a seam. As shown, the simple seam is just a folding back of the two pieces of fabric to be stitched together. This simple seam prevents the interlocking weave from simply slipping off the edge of the fabric under the extreme pressures that are often found in bulk bag usage. This seam generally creates about a 58% joint strength.

FIG. 4 depicts a pre-hemmed seam, which is created by not only folding the fabric back prior to making the joint, but by sewing the folded back portion of the fabric to itself. FIG. 4 shows fabric 13 with sewing stitch seam 11 and stitch to hold the hem 12, wherein the folded back portion is sewn to the fabric itself. This extra step generally creates a seam with an average strength of 63%. 63% over 58% is a strength increase of 8.5%. Even though there is extra labor to hem the fabrics, a strength increase gain of this size is often considered important in the industry.

Figures 5, 6:
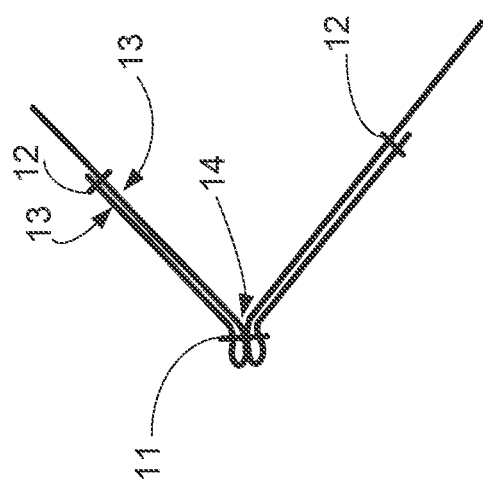
FIG. 5 illustrates a prior art pre-hemmed sewn seam of a bag in a filled position.
FIG. 6 is a chart showing test results of a fusion heat seam bulk bag of the present invention.

After the bag is made and filled, the pre-hemmed seam will be in the position shown in FIG. 5. FIG. 5 depicts heat seal joint 14. This means that the majority of the time, the seam is basically in a peel position whose strength is largely determined by the strength of the thread being used. But when seams are able to withstand forces only equal to 63% of the fabrics, then the fabrics must be overbuilt to take into account the seam's inefficiency.

When labor is taken into account as well, it is easily seen that the sewing operation is a very large factor in determining the final cost of making bulk bags.

Taking the same fabrics, and using the fusion heat seal seam method of the present invention, the graph shown in FIG. 6 shows that the seam strengths achieved, over 4 sets of tests, averaged 95.75% strength retention. This is a significant increase of strength retention with these fabrics.

When 95% of the original strength is being maintained through the fabric connections, equal fabrics may be used to carry heavier loads, or less fabric can be used to carry the same load. An embodiment of the present invention thus may provide a 50% gain in strength over the sewn seams.

The fusion heat seal seam not only creates a stronger seal, but it does it in a significantly different manner. The fusion heat seal seam of the present invention enables new bulk bag designs that will be able fill the needs of the bulk bag industry.

Figure 7:
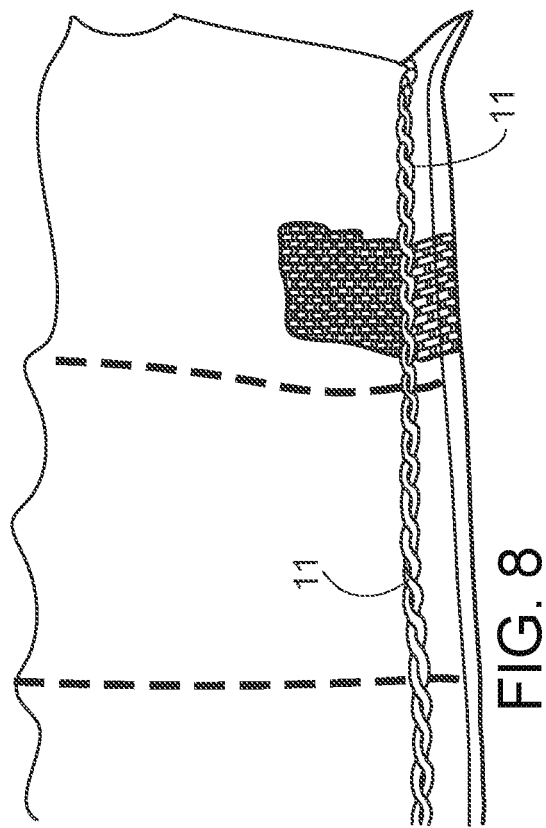
FIG. 7 is a perspective view of a bulk bag of the present invention with heat fusion seams.
Figure 8:
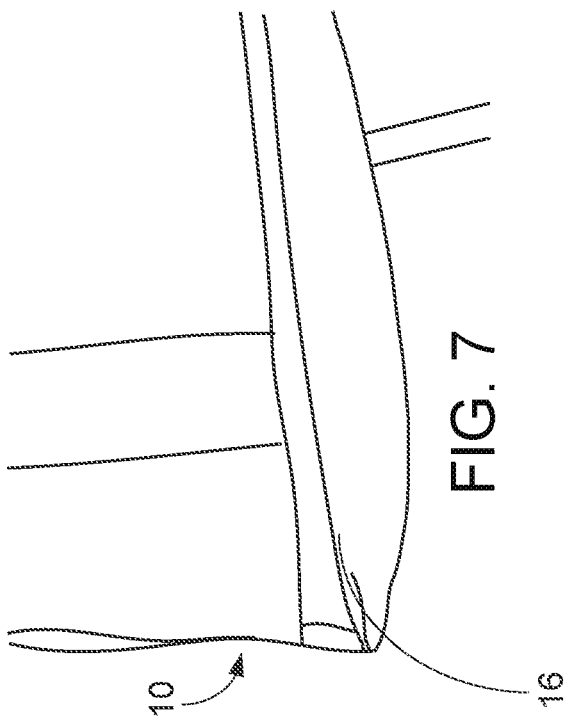
FIGS. 8-9 are prior art views of a sewn seam bag, and of the sewing process of the prior art.
Figure 9:
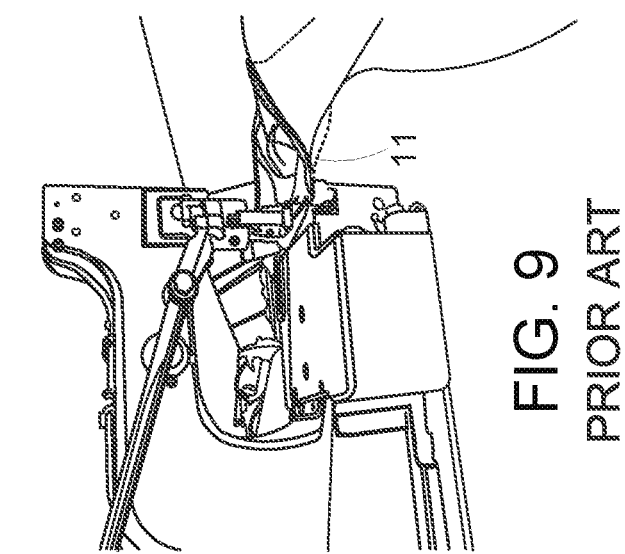

In the prior art, due to the nature of sewing machines and the size of bulk bags, the vast majority of seams must be sewn in an edge to edge peel position. The throat of a sewing machine is not big enough to easily allow an entire bulk bag to pass through the throat of the machine. Therefore, sewing is typically designed to place all seams in an edge to edge position as shown in FIG. 9. FIG. 7 depicts a fusion heat seal seam 16 of the fusion heat seal bag 10. FIG. 8 illustrates a prior art sewn seam 11.

Once a sewn seam prior art bag is made and filled, the sewn seam then is put into a peel position that depends entirely on the strength of the combination of the thread and needle punctured fabrics.

Figure 11:
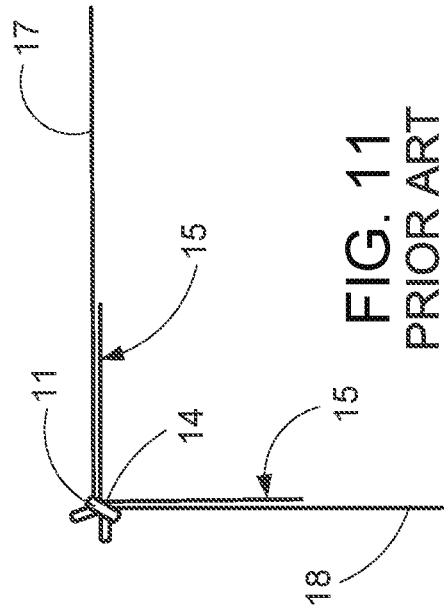
FIG. 11 illustrates the position of a prior art sewn seam when a bag is full.
Figure 10:
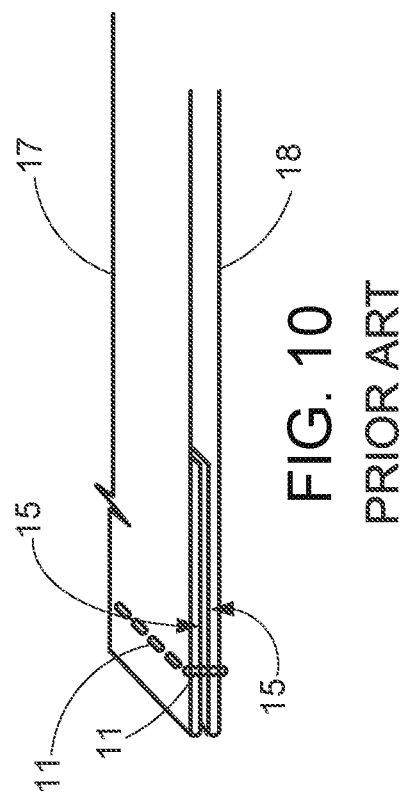
FIG. 10 illustrates the position of a prior art seam as sewn.

In FIG. 10, you can see the positions of the fabric as it was stitched by the machine above in FIG. 9. Stitch seam 11 is shown stitching together bag sidewall 17 and bag bottom wall 18. Fabric folds 15 are positioned so that fabric fold 15 of sidewall 17 is in contact with fabric fold 15 of bottom wall 18. In FIG. 11, the position of the stitch and fabric when the bag is in use are shown. Sewn stitch 11 and joint 14 are shown, wherein sidewall 17 and bottom wall 18 are attached. The fabric folds 15 of each wall 17, 18 are shown in an interior of the bag. Typically, a minimal fabric fold 15 will be 2 inches (5.08 cm) in depth on each side. This means the average sewn seam has 4 inches (10.16 cm) of doubled fabrics.

The fusion heat seal seam of the present invention is formed by over-lapping the fabrics to give the seal a wide shear area for strength. In an embodiment of the present invention, the fusion seam will get 95% of the original fabric strength. In a preferred embodiment, there will be an overlap of 1½ to 2 inches (3.81 cm to 5.08 cm). This saves a minimum of 2 inches (5.08 cm) of fabric in every joint as the prior art sewn method has 2 inches of doubled fabric layers on both sides of the seam.

Figure 12:
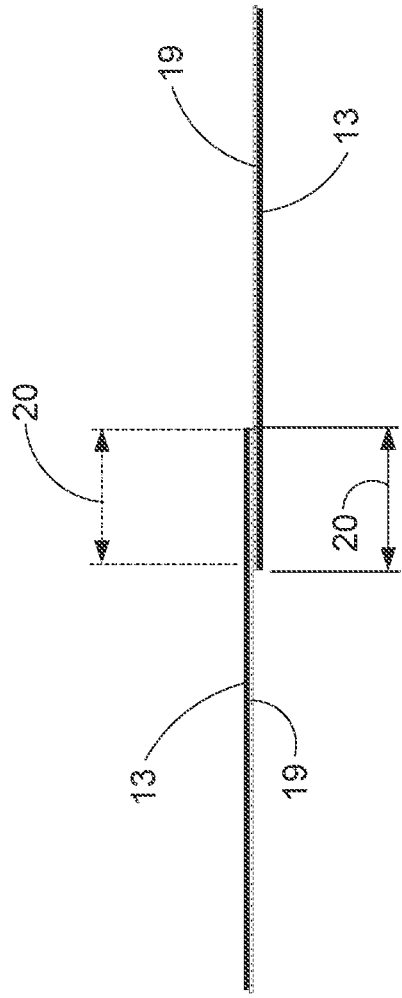
FIG. 12 illustrates a heat fusion seam of an embodiment of the present invention.

FIG. 12 depicts a fusion heat seal seam of the present invention. In FIG. 12, fabric 13 is shown as a dark line. Coating or lamination 19 of the fabrics is shown as a dotted line. Line 20 depicts the sealed or joined area of fabric, which may be 1½ to 2 inches (3.81 cm to 5.08 cm).

In an embodiment of the present invention the width of the overlap can be much smaller, for example 0.5 inches (1.25 cm) to save even more fabrics.

It is preferable, that the seams be sealed in a manner that no graspable edge be left on any exterior seams of the bag. This will discourage any attempt to rip the seal open in the peel position which is the weak direction of the fusion joint.

In an embodiment of the present invention, the preferred method is to overlap the fabrics only 1½ inches (3.81 cm) and center this under a 2 inch (1.25 cm) wide, for example, seal bar 21 as shown in FIG. 13. In FIG. 13, line 20 depicts the sealed area, which may be 1½ inches (3.81 cm) wide. This intentionally leaves a ¼ inch (0.64 cm) gap or transitional area, represented by arrow 22, on either side of the joint or sealed area 20. This insures that the ending edges of the two halves of the seal are sealed to the very edge. This leaves no graspable edge to create an easily peelable area.

The ¼ inch (0.64 cm) transitional area is small enough to prevent damaging heat from overcoming the smaller material volume of the single layer and allows for some small misplacement of the fabric edge lineup.

In an embodiment of the method of the present invention, a pulse heat process is used. By using impulse heat, the top temperature can be controlled and held to a desired amount of heat for a desired amount of time. This then allows the process to bring the material temperatures up to the desired level without going so high as to damage the fabrics but to also hold it there long enough to allow a thorough and even heating of the joint area.

It is, also, useful to the process to keep equal amounts of materials under the seal at all times. The impulse heat process is injecting equal heat throughout the sealing process. If an uneven amount of materials under the seal bar is too diverse, then areas with less materials may absorb more heat than desired and material damage can occur.

In FIG. 12, with only a single seal being made, the amount of heat applied is minimal enough that the ¼ inch (0.64 cm) transitional area or gap 22 allows enough heat dissipation to provide a very good seal without damage to surrounding materials.

An embodiment of the present invention involves stacking this process and creating multiple seals simultaneously. When stacking the process, placement of materials should be considered and keeping material amounts equal throughout will enable safe repeatability of the sealing process.

What has been described and shown so far is the difference between sewing seams and heat sealing to make a simple seam using polypropylene fabrics. Hereafter, the construction of bulk bags, that may routinely carry one ton of dry flowable materials, for example, will be discussed.

An objective of the present invention is to find ways to reduce the cost of making a product commonly called by several names. These names include bulk bags, Flexible Intermediate Bulk Containers, FIBC's, Big Bags or even Super Sacks (a trademark name of B.A.G. Corporation). Herein the product has been and will be referred to mostly as bulk bags.

The present invention has useful applications with bulk bag production, and is also useful to a number of other packages or products, for example smaller bags used to carry 25 to 100 pounds (11 to 45 kilograms). Other products that will benefit from the present invention include products stored or transported in flexible fabric packaging, wherein a sterile and air tight package is preferred.

Current bulk bag technology, using sewing machines typically travels stitch by stitch around every inch (centimeter) of seam on every part of the bag on an individual basis. In an embodiment of the present invention, the invention will simplify this process to create a productive system that can seal or join the fill spout to the top sheet, the top sheet to the bag body, the bottom sheet to the bag body, and the bottom discharge spout to the bottom sheet in a single moment or step. This eliminates a tremendous amount of labor and time.

Further, in an embodiment of the present invention each heat sealed seam may be approximately 50% stronger than the sewn seam. Because each joint requires less fabric than the sewn seam, the present invention enables production of a fabric bag that is demonstrably less expensive and more economical to make.

Use of heat sealing is known in the art. No matter what the shape of the seal to be made is, heat bars can be shaped to accomplish that seal and that shape. In an embodiment of the present invention, a square formed heat bar and structures to hold the fabric in place to allow the joining of the bottom of the bag to the sidewalls will be used to make a joint. Such equipment, however, may be large, bulky and expensive. Additional steps to complete the product and machines may be needed.

In an embodiment of the present invention, the method comprises using the fusion heat sealing method of the present invention for production of bulk bags, wherein individual joints are sealed sequentially, one after another. In another embodiment of the present invention, fewer steps and machines are used in fusion heat sealing a bulk bag. An objective of the present invention, is to simplify the number of steps when producing a bulk bag, as compared to prior art sewing methods.

There are many prior art designs in the bulk bag market but most of these designs fall into two basic categories. The body of the bag may be made from numerous pieces of flat panels sewn together or the body of the bag may be made from a single piece of tubular fabric that has no vertical seams.

All of the basic designs can be made using the system of the present invention. A preferred embodiment of the present invention will start with a tubular woven body.

Many bulk bags have a fill spout, a top panel, a circular woven body panel, a bottom panel and a discharge spout. The two spouts can be made with tubular fabric with no seams. The body of the bag may be made as tubular fabric with no seams. The top and bottom panels are generally square flat panels with a hole cut into them to accommodate the spouts that must be attached to them. FIG. 14 depicts a fill or discharge spout 23. Line 24 represents, for example, a 22 inch width for a (55.88 cm) spout tube, lying flat. Line 25 represents, for example, a 18 inch (45.72 cm) long fill or discharge spout.

FIG. 15 depicts example top or bottom panels 26. In FIG. 15, the top or bottom panel 26 is relatively square with sides being 41 inches (104.14 cm) for example, as represented by lines 29. Area 30 represents a connection area for the fill or discharge spout, with lines 28 being 11 inches (27.94 cm) for example.

FIG. 16 depicts a tubular fabric 27, without seams. Line 31 may represent a 45 inch (114.30 cm) height, for example, and line 32 may represent a 74 inch (187.96 cm) width, when the tubular fabric is lying flat.

Thus, FIGS. 14-16 depict five potential pieces of fabric, a fill spout 13, a discharge spout 13, a top panel 23, a bottom panel 23, and a tubular fabric piece 26.

In an embodiment of the present invention, a bulk bag may be produced, using fusion heat seal process, in a single step. In a preferred embodiment, the fabric pieces will be gusseted and placed in position for the heat fusion sealing process. The FIGS. 17-20 depict the final form of the fabrics in a preferred embodiment, just prior to making the basic bag.

In a preferred embodiment the coating side of the fabrics is on the outside of the tubes and on the inside of the flat panels, so that the coatings will be facing each other when the bag is formed.

These coating positions can be reversed and put inside of the tubes and outside of the flat panels for top and bottom, but since coating naturally comes on the outside of tubular fabric, the preferred method is the one shown in the drawings.

Figure 17:
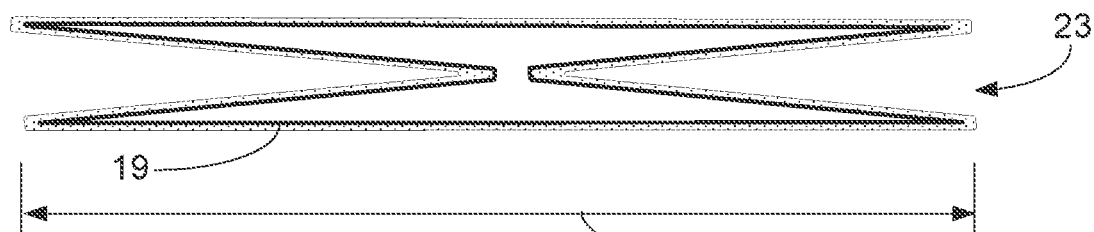
FIG. 17 illustrates an end view of a folded fill or discharge spout of an embodiment of a heat fusion seal bag of the present invention.
Figure 18:
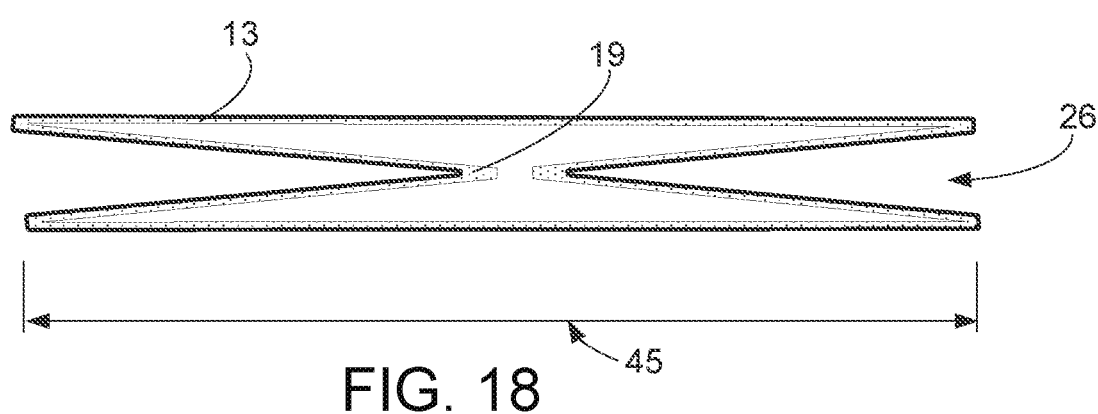
FIG. 18 illustrates an end view of a folded top or bottom panel of an embodiment of a heat fusion seal bag of the present invention.
Figure 19:
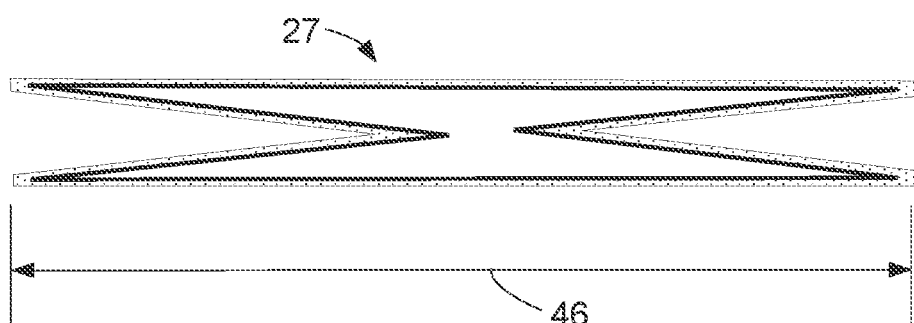
FIG. 19 illustrates an end view of a folded bag body of an embodiment of a heat fusion seal bag of the present invention.
Figure 20:
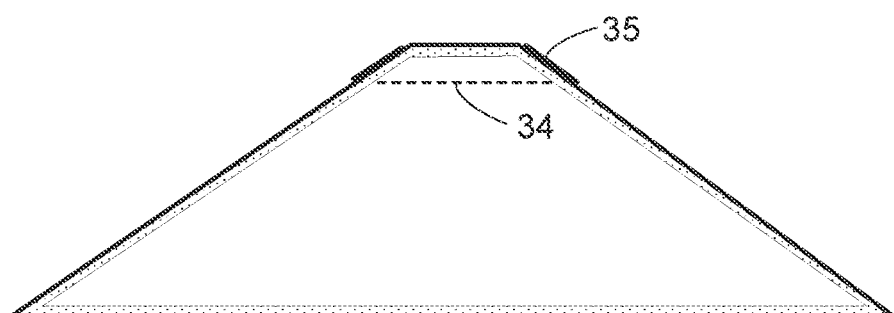
FIG. 20 illustrates a side view of a folded top or bottom panel of an embodiment of a heat fusion seal bag of the present invention.

FIGS. 17-19 depict folding the bulk bag parts prior to heat sealing in a single step. As shown in FIGS. 17-19, the folded shape of every piece is basically the same shape. FIG. 17 depicts an end view of folded fill or discharge spouts 23, wherein the coating or lamination 19 is on the outside. Line 33 depicts an 11 inch (27.94 cm) width area, for example. FIG. 18 illustrates an end view of top or bottom panels 26 wherein the coating or lamination 19 is on the inside. Line 45 depicts a 41 inch (104.14 cm) area, for example. FIG. 19 illustrates an end view of a folded tubular bag body 27 wherein the coating or lamination 19 is on the outside. Line 46 depicts a 37 inch (93.98 cm) area. FIG. 20 depicts a side view of a folded top and bottom, wherein coating 19 is on the inside. Dotted line 34 represents a future fold line. Corner slits 35 are also shown. Approximately a 45 degree angle may be formed.

The folding arrangement as described above, enables each piece to fit inside or around the piece it will be connected to in the production process.

Figure 21:
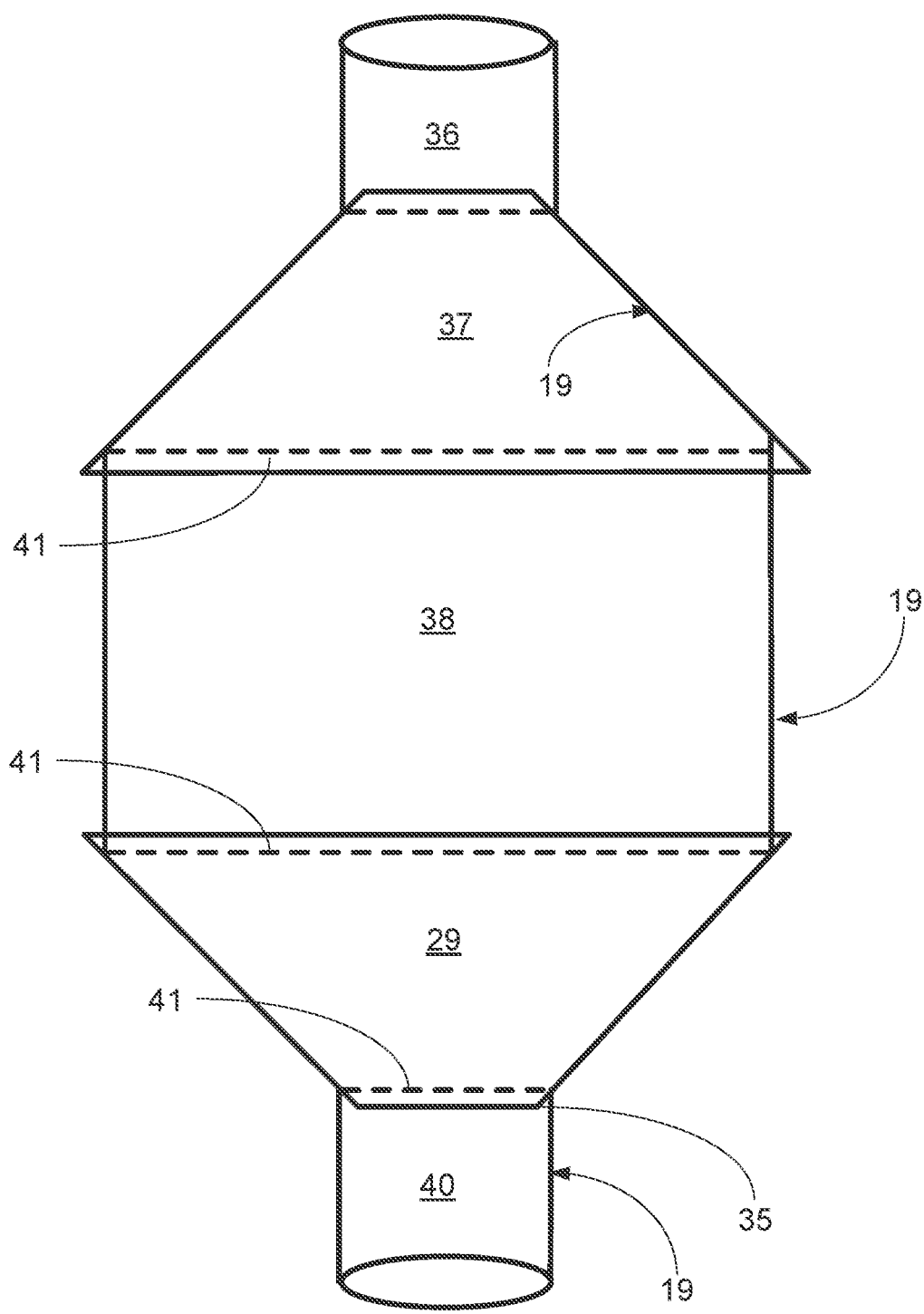
FIG. 21 illustrates an overall view of embodiment of a heat fusion sealed bag of the present invention.
Figure 22:
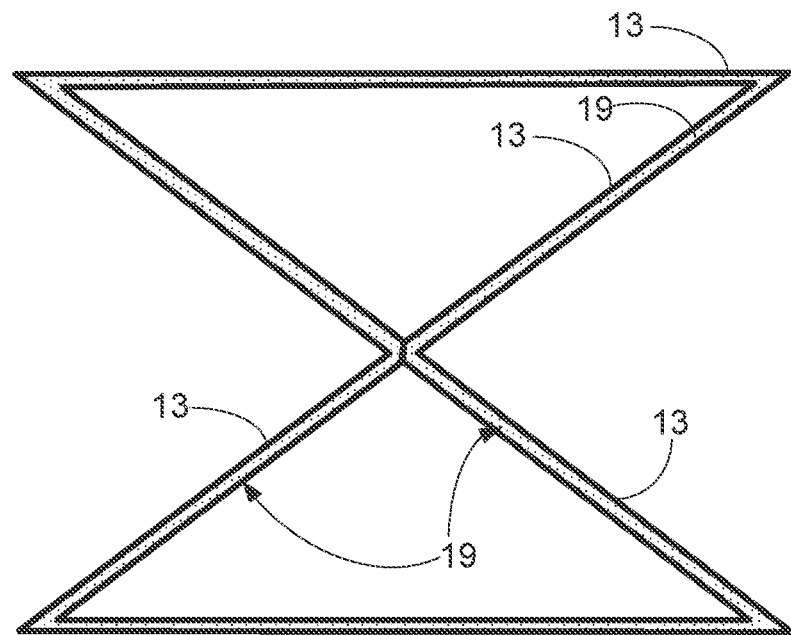
FIG. 22 illustrates layering of fabrics in an embodiment of the heat fusion seal method of the present invention.
Figure 23:
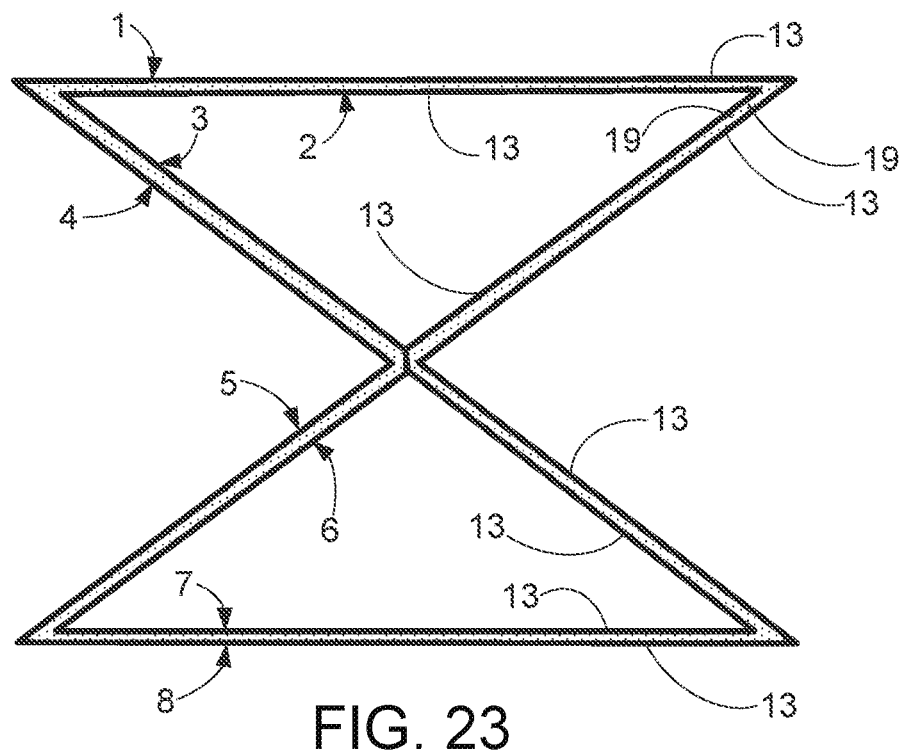
FIG. 23 illustrates layering of fabrics in an embodiment of the heat fusion seal method of the present invention.

Once the shapes are put together, the bag is ready to seal as shown in FIG. 21. At each of the four fusion heat seal areas or joints 41, the parts are positioned with the outer part having the coating 19 facing inward and the inner part having the coating 19 facing outward as shown in FIGS. 22-23.

This results in a total of 8 layers of fabric at all points from bottom to top. In FIGS. 22-23, layers 1-8 are shown.
Example; Connection of top to Body of bag.

| | | | |
|---|---|---|---|
| 1. | Top layer | Top Panel | flat side |
| 2. | Second layer | Body Panel | flat side |
| 3. | Third Layer | Body Panel | Gusset side |
| 4. | Fourth layer | Top Panel | Gusset Side |
| 5. | Fifth layer | Top Panel | Gusset Side |
| 6. | Sixth Layer | Body Panel | Gusset Side |
| 7. | Seventh Layer | Body Panel | Flat Side |
| 8. | Eighth Layer | Top Panel | Flat Side |

By lining up multiple layers in this fashion, heat fusion method of the present invention is able to completely join the top to the body panel in a single action. When the structure as depicted in FIGS. 22-23 is collapsed, the structure is always coating 19 to coating 19 for joint creation and fabric 13 to fabric 13 for not creating a joint. In the drawings the gussets may be positioned so as to fit together and during production, fabrics are collapsed to a flat condition.

All four joints are made in the same manner.

The method of the present invention using impulse sealing to make joints through multiple layers without exceeding the safe temperature limit, comprises controlled heating that will not rise above the desired level which is less than the melting point of the polypropylene fabric.

In a preferred embodiment, in order to get the entire group of intended joints to the right temperature level without damaging the fabric strength, time will be employed to allow the required heat to become universal throughout the 8 layers of materials.

Further, it will be useful if the heat mechanisms are mirrored on the top and bottom so that heat may need to travel only 50% of the total thickness. This process may also be achievable with one heating element by using a greater time for the heat to travel throughout the entire stack of fabrics. A preferred method uses heating elements on both top and bottom of the stack.

In an embodiment of the present invention, a single machine with 4 heating elements on top and four heating elements on the bottom can effectively seal, in a single action, all four of the joints shown in FIG. 21 of the complete bag.

The fabrics can be placed and positioned under the sealing mechanisms so that the heat sealing bars cover the area to be joined plus a ¼ inch (0.64 cm) overlap, for example, to enable sealing of all edges and to also make them ungraspable. In an embodiment of the present invention, the mechanisms can control heat, time and pressure. When this is done, the bags can be put together in a completely repeatable and dependable fashion with this stage of production requiring a single automatable machine.

When making bulk bags in this manner, different sizes of bags can be made by simply changing the length of the body panel. This would require only the movement of two heating elements to match the new distance between the top and bottom panel attachments. The relationship or distance between the spout joints and the top and bottom panel would be unchanged.

The method of the present invention may also be used to create different designs of bulk bags, for example baffle bags or bags with lifting loops, with heat fused seals or joints.

This system eliminates the need for threads and the resulting contamination that often occurs when a cut piece of thread is left inside the bag. It reduces contamination from sewing machines coming into contact with various parts of the bag. It reduces human contact with the inner surfaces of the bag.

Since the seams are solid without any needle holes, this system eliminates any need for sift-proofing that is often required for stitched bulk bags. The method of the present invention provides a bag that is nearly air tight.

Due to the airtightness and the cleanliness, it is perceived that this production system may eliminate the need for polyethylene liners that are often added to the inside of the bulk bag for cleanliness and/or moisture control. This will reduce the amount of plastic used in the industry and therefore reduce the amount of materials eventually going into landfill.

Notably all four of the seams shown in the preferred embodiment put the final seams in the sheer position to withstand the forces of the heavy weights that bulk bags carry. Further, the act of carrying the weight will always stress these seams in only the shear position.

Thus, in the method of the present invention for automating production of flexible bags, packages or containers, it should be understood that this method would cover all kinds of flexible bags, packages or containers.

As previously discussed, the bulk bag industry uses a highly oriented woven polypropylene fabric. This is based on a cost versus strength matrix. Polypropylene has historically been lower in cost per pound (kilogram) and historically stronger than similar polyethylene by about 30% in tensile strength. While it was always possible to use a thicker polyethylene material to make bulk bags, there has been limited interest in using that material due to the ensuing cost of getting the needed strength. Further, polyethylene fabrics have a lower melting point than polypropylene fabrics so once again, polypropylene has been a preferred material for nearly 40 years in this industry. Polypropylene is also a very inert material. It is unaffected by almost every chemical. This also makes it a good choice for making packaging bags. With all of these benefits for the industry, one area where polypropylene falls short of polyethylene, has been the result of polypropylene's inertness and its strength due to high levels of orientation.

Because of this inertness, the entire industry has relied upon a physical connection of materials for the container construction. It has relied nearly 100% on sewing as the method of construction.

One of the common alternate methods of connection to sewing that is automatable has been to use heat to form joints. When PE fabrics are used, this is very common. But polypropylene crystallizes at the level of heat needed to form a joint. This crystallization destroys the joint strength rendering this method previously unusable. There are currently no known methods of heat sealing polypropylene fabrics together that create usable seams for the construction of polypropylene bags such as bulk bags.

As stated earlier, the sewing process is very labor intensive and very poorly suited for any form of automation. Sewing machines have very high speed parts moving to allow sewing stitches to be applied at thousands of stitches per minute. At these speeds, even if the machines were operated robotically, needles and threads are continually breaking and needing human repair to be put back into operation. Therefore, due to the inability to run without constant human support, the bulk bag industry has never been able to automate its production in an efficient and cost effective manner. This has led to the loss of all of these jobs to overseas plants located in low labor cost countries.

Therefore, there is a need for an automatable system of bag construction that will reduce the high levels of labor currently required in the construction of bulk bags. This will allow the production to be positioned close to the end users and eliminate the extremely long lead times and high inventory needs that the industry suffers with under the current sewing construction methods.

An embodiment of the method of this invention comprises a method of constructing woven fabric bags using a new and unique heat sealing method. Use of a heat sealing process is well known and quite common in the joining of woven polyethylene fabrics. It is commonly understood that a joint efficiency of 80% to 85% is an extremely good joint efficiency level. Many operations accept much lower joint efficiencies that range down into the 70's of the percentage of efficiencies.

In the sewn seams, the efficiency is often only 65%. The strength of the polypropylene fabric takes these joint efficiencies into consideration when choosing the strength of the fabric that will be used in the construction of the final container.

Current methods of heat sealing usually involve high enough heat and high enough applied pressure to melt the basic fabrics and join them together. This method purposefully, melts any applied coating and squeezes it aside through the high pressure levels so that the base woven materials can be joined together. This method has been successful, with polyethylene fabrics for example, for several decades. It was necessary because the strength being relied upon came from the woven fabrics. The coatings that were generally applied, were applied for the purpose of providing dust and/or moisture control.

Because polypropylene is so inert, the coatings being applied had low attachment strength to the woven fabrics. Therefore, if they were to be used as the attachment point by welding the applied coatings together, the resulting strength would have no real relationship to the strength of the fabric. The resulting joint strength would only be related to the strength of the coating's attachment to the woven fabrics. When conducting testing with regard to the present invention, of making joints that relied on the strength of the coating's attachment using the present technology, results showed about a 27% joint efficiency on the particular strength of materials tested. In these tests, it was never the fabric that broke. It was always the coating detaching from the fabric that caused the joint to fail.

In the present invention, a coating that can be applied in a standard extrusion coating method attaches so completely to the polypropylene fabrics that it is no longer necessary to apply high pressure that will squeeze the coating out from under the heated jaws of the sealing mechanism. In fact, by sealing under less than 10 psi (68.9 kilopascal), it is an objective of this invention to utilize the strength of the applied coating as part of the strength of the final heat seal. The fabric itself is nearly undamaged during this heat sealing method. In an embodiment of the present invention, only the coating is intended to be melted to create the joint. Tests results show achievement of over 90% joint strengths. Some tests results are running up as high as 100% of the strength of the coated materials that have not been sealed. However, the resulting strength of the joints many times exceeds the strength of the original fabric itself prior to it having been coated.

Therefore in an embodiment of the method of the present invention, the method of heat sealing creates seams that are sometimes actually stronger than the original fabric before any process begins. Considering that the current methods are working with sewn seams that have a 65% joint efficiency, it is an objective of the present invention that this heat sealing method will makes heat joints with minimal damage to the original fabric and will allow not only lower costs through automation to reduce labor costs, but will provide many opportunities to reduce fabric weights and thicknesses while providing similar overall strengths through the higher seam efficiencies. An example would be as follows; if the sewn fabric had a tensile strength of 200 pounds per inch (3,572 kilograms/meter), after being sewn the seam would have a strength of 65% of the 200 pounds per inch (3,572 kilograms/meter) or only 130 pounds (58 kilograms). With a 90% joint efficiency, a fabric that had an original strength of 150 pounds per inch (2,678 kilograms/meter) would still create a seam strength of 135 pounds per inch (2,410 kilograms/meter). This would allow a 25% reduction in the strength of the fabric to create an equal seam. This obviously then will lead to long term reductions on the amount of fabrics needed with this system to create bags with similar strengths.

All seams have at least two measurements that are critical to its success. These are generally called shear and peel tests.

In the shear tests, the joint is made with two ends of the material being joined at opposite ends of the joint area. When the free ends of the materials are pulled in opposite directions, the entire sealed area supports the joint efficiently. This results in the highest possible demonstration of the sealed joint efficiency.

In the peel test, two free ends of the test materials are on the same side of the joint. In this case, when the two free ends are pulled apart, only one edge of the seal is stressed at any one time. This results in the peeling of the joint as the ends are pulled apart. This typically results in the lowest joint efficiency.

Figure 24:
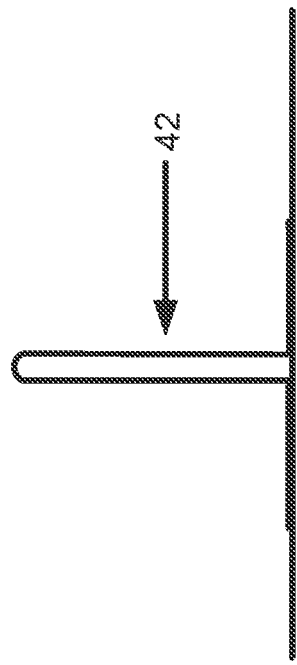
FIG. 24 illustrates a sample of a heat fusion seam of the present invention wherein the fabric of the wall is doubled.
Figure 26:
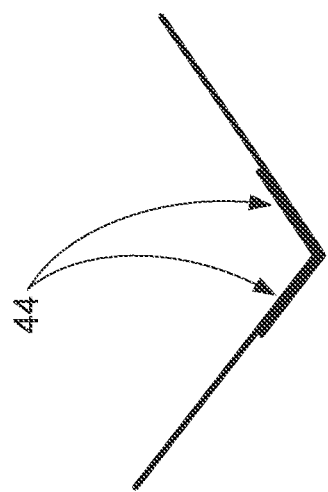
FIG. 26 illustrates an isolated view of a heat fusion seal of the present invention wherein the edges of the fabric at the point of the seal are overlapped.
Figure 25:
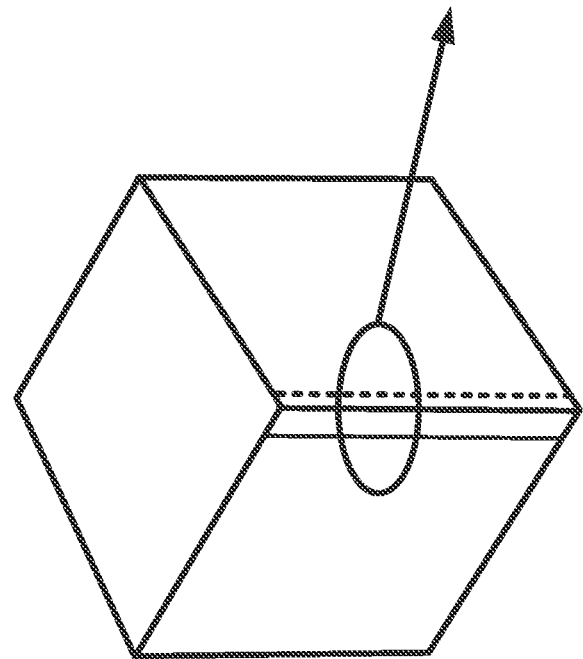
FIG. 25 illustrates an overall view of a fusion heat sealed fabric bag of the present invention.

An embodiment of the present invention is illustrated in FIGS. 24-26. FIG. 24, depicts a joint wherein the fabric wall is doubled, in an upside down "T" shape construction. As the fabric meets the end wall, one leg goes to each side, and pressure from either side protects the opposite side with its shear strength. In FIG. 25, a fusion heat sealed bulk bag 10 can be designed in a manner such that lap seams as shown can be used. The product will always be pushing the joint in the shear direction, as illustrated by arrows 44 in FIG. 26, which depict pressure being applied from product held within a bag.

PARTS LIST

| PART NUMBER | DESCRIPTION |
|---|---|
| 1 | layer |
| 2 | layer |
| 3 | layer |
| 4 | layer |

-continued

PARTS LIST

| PART NUMBER | DESCRIPTION |
|---|---|
| 5 | layer |
| 6 | layer |
| 7 | layer |
| 8 | layer |
| 10 | heat Fusion Seam Bulk Bag |
| 11 | stich seam |
| 12 | stich to hold hem |
| 13 | fabric |
| 14 | sewn joint |
| 15 | fabric fold |
| 16 | fusion heat sealed seam |
| 17 | side wall |
| 18 | bottom wall |
| 19 | coating/lamination |
| 20 | line |
| 21 | heat seal bar |
| 22 | transitional gap |
| 23 | fill/discharge spout |
| 24 | line |
| 25 | line |
| 26 | top/bottom panel |
| 27 | body |
| 28 | sewn seam |
| 29 | line |
| 30 | area |
| 31 | line |
| 32 | line |
| 33 | line |
| 34 | future fold line |
| 35 | corner slit |
| 36 | gusseted fill spout |
| 37 | gusseted top panel |
| 38 | gusseted body |
| 39 | gusseted bottom panel |
| 40 | gusseted discharge spout |
| 41 | fusion seal area |
| 42 | double fabric wall |
| 43 | lap seam |
| 44 | pressure from bag contents |
| 45 | line |
| 46 | line |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of forming a flexible plastic fabric bulk bag with heat sealed joints, comprising the steps of:
   a) providing a first folded bag portion having a first pair of outer left edges and a first pair of outer right edges, wherein a first left side panel of the first folded bag portion is drawn inward in between the first pair of outer left edges and wherein a first right side panel of the first folded bag portion is drawn inward in between the first pair of outer right edges;
   b) providing a second folded bag portion having a second pair of outer left edges and a second pair of outer right edges, wherein a second left side panel of the second folded bag portion is drawn inward in between the second pair of outer left edges and a second right side panel of the second folded bag portion is drawn inward in between the second pair of outer right edges;
   c) overlapping the first and second folded bag portions to define an overlapped area, wherein in the overlapped area interior surfaces of the first folded bag portion are in contact with exterior surfaces of the second folded bag portion, and wherein exterior surfaces of the first folded bag portion are in contact with one another, and interior surfaces of the second folded bag portion are in contact with one another;

d) applying heat and pressure to the overlapped area to form a heat sealed bag joint between the interior surfaces of the first folded bag portion and exterior surfaces of the second folded bag portion that are in contact; and wherein the bag joint is not formed between at least some exterior surfaces of the first folded bag portion that are in contact with other exterior surfaces of the first folded bag portion and under the heat and pressure and the bag joint is not formed between at least some interior surfaces of the second folded bag portion that are in contact with other interior surfaces of the second folded bag portion and under the heat and pressure so that the bulk bag can expand to an open configuration when filled with bulk material.

2. The method of claim 1 wherein the first folded bag portion and the second folded bag portion are made from polypropylene fabric.

3. The method of claim 1 wherein the first folded bag portion and the second folded bag portion are made from polyethylene fabric.

4. The method of claim 1 wherein the first folded bag portion is a bottom portion and the second folded bag portion is a body portion.

5. The method of claim 1 wherein the first folded bag portion is a top portion and the second folded bag portion is a body portion.

6. The method of claim 1 wherein the first folded bag portion is a top portion and the second folded bag portion is a top spout.

7. The method of claim 1 wherein the first folded bag portion is a bottom portion and the second folded bag portion is a discharge tube.

8. The method of claim 1 wherein the bulk bag can hold 2,000 to 4,400 pounds of bulk material.

9. The method of claim 4 wherein the bag joint is a bottom load bearing joint.

10. The method of claim 1 wherein the bag joint retains at least 85% to 100% of the fabric strength.

11. A method of forming a flexible plastic fabric bulk bag, comprising the steps of:

a) providing a folded first bag portion having a first pair of opposing gussets and a first open end;

b) providing a folded second bag portion having a second pair of opposing gussets and a second open end;

c) overlapping the first and second open ends to form an overlapped area and put at least some interior surfaces of the folded first bag portion in contact with at least some exterior surfaces of the folded second bag portion, and wherein in the overlapped area some exterior surfaces of the folded first bag portion are in contact with one another;

d) applying heat and pressure to the overlapped area to form a heat sealed bag joint between the interior surfaces of the folded first bag portion and the exterior surfaces of the folded second bag portion that are in contact; and e) wherein the bag joint is not formed between at least a substantial portion of the exterior surfaces of the folded first bag portion that were in contact with each other in the overlapped area when exposed to the heat and pressure at step (d) and the bag joint is not formed between at least a substantial portion of surfaces of the folded second bag portion that were in contact with each other when exposed to heat and pressure at step (d) so that the bulk bag can expand to an open configuration after the bag joint is formed.

12. The method of claim 11 wherein the folded first bag portion and the folded second bag portion are made from polypropylene fabric.

13. The method of claim 11 wherein the folded first bag portion is formed from a nontubular piece of flexible plastic fabric and the folded second bag portion is formed from a tubular piece of flexible plastic fabric, and wherein the first open end has a shape that enables a portion of the folded second bag portion to fit inside the folded first bag portion in the overlapped area.

14. The method of claim 13 wherein the folded first bag portion is a bottom portion and the folded second bag portion is a body portion.

15. The method of claim 13 wherein the folded first bag portion is a top portion and the folded second bag portion is a body portion.

16. The method of claim 13 wherein the first folded bag portion is a top portion and the second folded bag portion is a top spout.

17. The method of claim 13 wherein the first folded bag portion is a bottom portion and the second folded bag portion is a discharge tube.

18. The method of claim 11 wherein the bulk bag can hold 2,000 to 4,400 pounds of bulk material.

19. The method of claim 11 wherein the bag joint retains at least 85% to 100% of the fabric strength.

20. A method of forming a flexible plastic fabric bulk bag, comprising the steps of:

a) providing a folded first bag portion having a first open end, wherein the folded first bag portion is formed by folding a substantially flat piece of fabric;

b) providing a folded second bag portion having a second open end, wherein the folded second bag portion is formed by folding a tubular piece of fabric and wherein the second open end of the second folded bag portion has substantially the same shape as the first open end of the folded first bag portion;

c) overlapping the first open end and the second open end to form an overlapped area of the folded first bag portion and the folded second bag portion and to put interior surfaces of the folded first bag portion in contact with exterior surfaces of the folded second bag portion, and wherein part of the folded second bag portion is inside the folded first bag portion and a portion of the folded first bag portion is around the part of the folded second bag portion in the overlapped area, and wherein some exterior surfaces of the folded first bag portion are in contact with one another in the overlapped area;

d) applying heat and pressure to the overlapped area to form a heat sealed bag joint between the interior surfaces of the folded first bag portion and the exterior surfaces of the folded second bag portion that are in contact; and e) wherein the bag joint is not formed between at least a substantial portion of said exterior surfaces of the folded first bag portion that were in contact with each other in the overlapped area when exposed to the heat and pressure at step (d) and the bag joint is not formed between at least a substantial portion of surfaces of the folded second bag portion that were in contact with each other when exposed to heat and pressure at step (d) so that the bulk bag can expand to an open configuration after the bag joint is formed.

\* \* \* \* \*